(12) United States Patent
Kurosawa

(10) Patent No.: US 11,846,585 B2
(45) Date of Patent: Dec. 19, 2023

(54) DROPLET SENSOR WITH A PROTECTIVE FILM

(71) Applicant: Hideo Kurosawa, Tokyo (JP)

(72) Inventor: Hideo Kurosawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/663,881

(22) Filed: May 18, 2022

(65) Prior Publication Data

US 2022/0373459 A1 Nov. 24, 2022

(30) Foreign Application Priority Data

May 20, 2021 (JP) ................. 2021-085071

(51) Int. Cl.
*G01N 21/43* (2006.01)
*B60S 1/08* (2006.01)
(52) U.S. Cl.
CPC ............ *G01N 21/43* (2013.01); *B60S 1/0859* (2013.01); *G01N 2021/435* (2013.01)
(58) Field of Classification Search
CPC ............ G01N 21/43; G01N 2021/435; G01N 21/552; B60S 1/0859; B60S 1/0837
See application file for complete search history.

(56) References Cited

U.S. PATENT DOCUMENTS 3,637,294 A * 1/1972 Berthold, III .......... G02B 5/285
359/582
2021/0102894 A1 4/2021 Kawasaki et al.

FOREIGN PATENT DOCUMENTS

JP 2019-120567 7/2019

* cited by examiner

*Primary Examiner* — Hwa Andrew Lee
(74) *Attorney, Agent, or Firm* — IPUSA, PLLC

(57) ABSTRACT

A droplet sensor includes an optical cover having a curved surface that forms a part of a spheroid, a protective film that covers the curved surface of the optical cover, a light source provided at a first focal point of an ellipse facing the curved surface, and a photodetector provided at a second focal point of the ellipse. The refractive index of the protective film is greater than the refractive index of a liquid to be detected. A sensing region is determined by a range of an incident angle at which a light beam emitted from the light source and incident onto the curved surface is totally reflected at the interface between the protective film and a gas, and is not totally reflected at the interface between the protective film and the liquid to be detected.

11 Claims, 19 Drawing Sheets

REGION (A)

REGION (B)

REGION (A)

REGION (B)

REGION (A)

REGION (B)

REGION (D)

REGION (A)

REGION (D)

(i) $n_0 < n_0' < n_1 < n_2 < n_3 < n_4$
(ii) $n_0 < n_0' < n_4 < n_3 < n_2 < n_1$
(iii) $n_0 < n_0' < n_1 < n_4 < n_3 < n_2$
(iv) $n_0 < n_3 < n_0' < n_1 < n_2 < n_4$ $n_0 < n_4 < n_0' < n_3 < n_2 < n_1$

DROPLET SENSOR WITH A PROTECTIVE FILM

CROSS-REFERENCE TO RELATED APPLICATIONS

This application is based upon and claims priority to earlier Japanese Patent Application No. 2021-085071 filed May 20, 2021, which is incorporated herein by reference in its entirety.

FIELD

The present invention relates to a droplet sensor that senses droplets, such as raindrops or water droplets.

BACKGROUND

A sensor having an optical cover which forms a part of a spheroid to detect droplets has been proposed. This sensor is configured to detect droplets making use of a change in reflectance at the surface of the optical cover, depending on whether the substance of the optical cover is in contact with air or water. See, for example, Patent Document 1 presented below.

Droplet sensors are placed outdoors to detect raindrops or measure the amount of rainfall, and are directly exposed to natural phenomena such as rain, wind, or sunlight. It is desirable to select the optical materials used in droplet sensors in consideration of durability and weather resistance, as well as the optical characteristics.

In fabricating an optical component which forms a part of a spheroid, monolithic or seamless molding using a plastic material is efficient. However, plastics tend to change colors due to ultraviolet rays when left outdoors for a long time, and the transparency or the transmittance will deteriorate. For example, polycarbonate tends to yellow over time due to ultraviolet rays. Plastics are soft materials and the surfaces are easily scratched. When using another optical material in place of plastics, it is necessary to redesign the shape of the spheroid in consideration of the optical characteristics including the transparency and the refractive index of the material. Processing or machining a spheroid itself is difficult depending on the optical material.

Related document described above is

Patent Document 1: JP 2019-120567 A.

SUMMARY

In order to suppress deterioration and improve durability, it may be conceived to apply coating onto the surface of plastic, without changing the plastic material itself. However, covering the surface of the optical component with other substances may prevent the desired optical characteristics from being achieved. To avoid such a disadvantage, the effect of the coating has to be understood in advance, and the optical component has to be carefully designed so as to achieve the demanded function and performance.

One of the objectives of the invention is to provide a droplet sensor with improved durability or weather resistance, while maintaining the incident-angle dependence of the reflectance with respect to the liquid to be detected.

In one aspect, a droplet sensor includes
  an optical cover having a curved surface that forms a part of a spheroid,
  a protective film that covers the curved surface of the optical cover,
  a light source provided at a first focal point of an ellipse facing the curved surface, and
  a photodetector provided at a second focal point of the ellipse,
  wherein the refractive index of the protective film is greater than a refractive index of a liquid to be detected, and
  wherein a sensing region is determined by a range of an incident angle at which a light beam emitted from the light source and incident onto the curved surface is totally reflected at the interface between the protective film and a gas, and is not totally reflected at the interface between the protective film and the liquid to be detected.

In another aspect of the invention, a droplet sensor includes
  an optical cover having a curved surface that forms a part of a spheroid,
  a protective film that covers the curved surface of the optical cover,
  a light source provided at a first focal point of an ellipse facing the curved surface, and
  a photodetector provided at a second focal point of the ellipse,
  wherein a refractive index of the protective film is greater than a refractive index of a gas being in contact with the protective film and smaller than a refractive index of a liquid to be detected, and
  wherein a sensing region is determined by a range of an incident angle of a light beam incident onto the curved surface from the light source, the range being greater than a critical angle at an interface between the protective film and the gas and being smaller than $\sin^{-1}(n_2/n_1)$, where $n_1$ denotes the refractive index of the optical cover, and $n_2$ denotes the refractive index of the protective film.

DETAILED DESCRIPTION OF EMBODIMENT(S)

In the embodiments, the refractive index of the protective film used in a droplet sensor, and the range of incident angle of the sensing light are appropriately selected to correctly detect the change in reflectance at the sensor interface.

Figure 1:
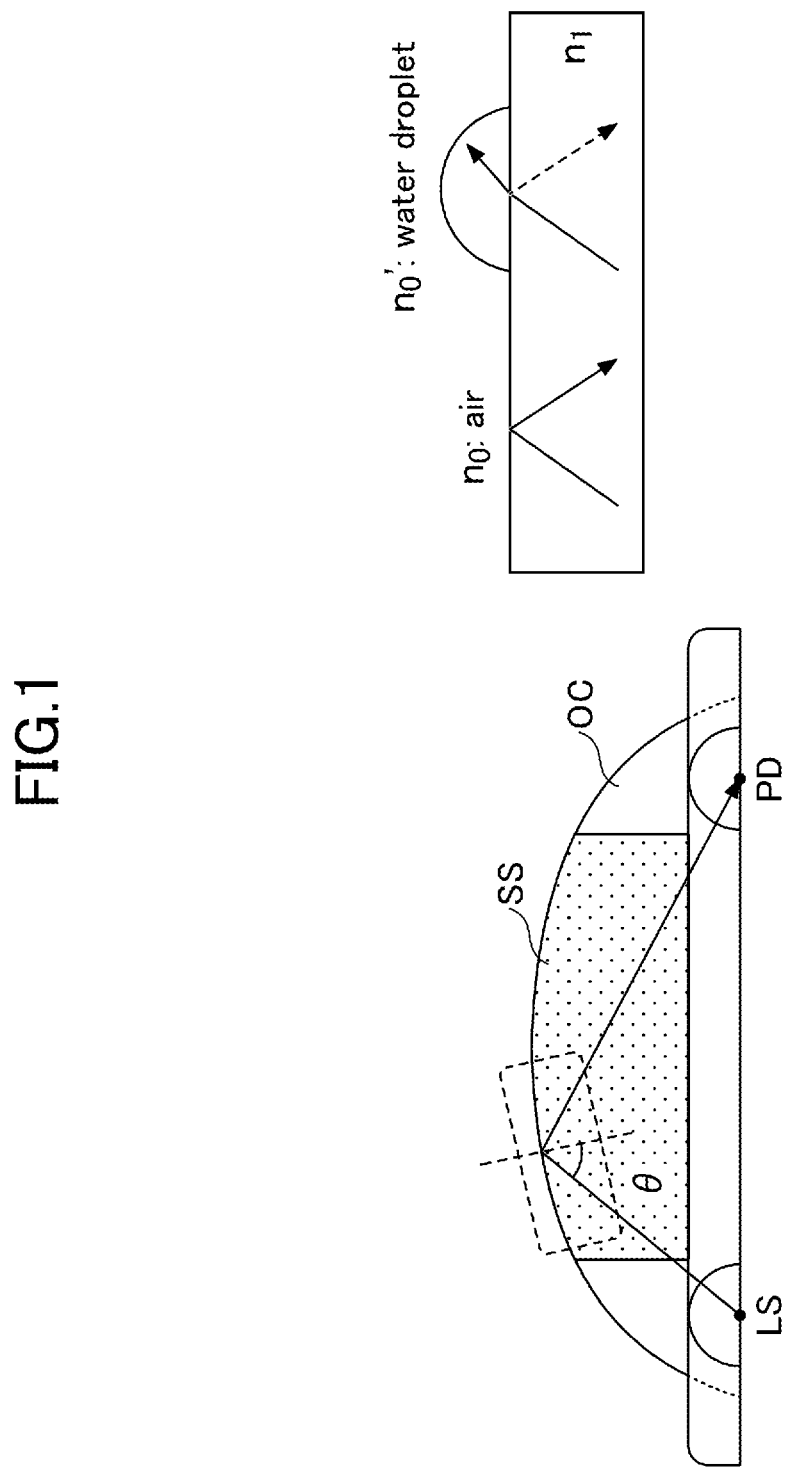
FIG. 1 is a diagram showing the basic idea of sensing without protective coating.

FIG. 1 illustrates the basic idea of sensing without a protective film. Although, in the embodiment, a protective film is provided onto the optical cover of the droplet sensor in order to protect the sensor from the environment, the behavior and characteristics of the droplet sensor are the same as those in the configuration without the protective film.

Without the protective film, the presence of droplets is detected based on the change in reflectance, which occurs depending on the presence or absence of water droplets on the sensing surface SS of the optical cover OC. The refractive index of the optical cover OC of the sensor is $n_1$, the refractive index of the gas such as air being in contact with the optical cover OC is $n_0$, and the refractive index of water droplets is $n_0'$. If the optical cover OC is surrounded by the air, the light output from the light source LS is totally reflected at the sensing surface SS, and detected by the photodetector PD.

When a water droplet has attached onto the sensing surface SS of the optical cover OC, the condition of total internal reflection can no longer be satisfied with respect to the light incident onto the interface between the water droplet and the optical cover OC, and most of the light enters the water droplet. The dashed arrow in FIG. 1 indicates reflection or loss at the interface due to the difference in refractive index between the optical cover OC and the water droplet. The quantity of such a reflected light component is very small, and only a small quantity of light is reflected toward the photodetector PD. The quantity of light received at the photodetector PD changes corresponding to the change in reflectance depending on whether water droplets are present on the sensing surface SS, whereby the presence or absence of water droplets is detected.

Figure 2:
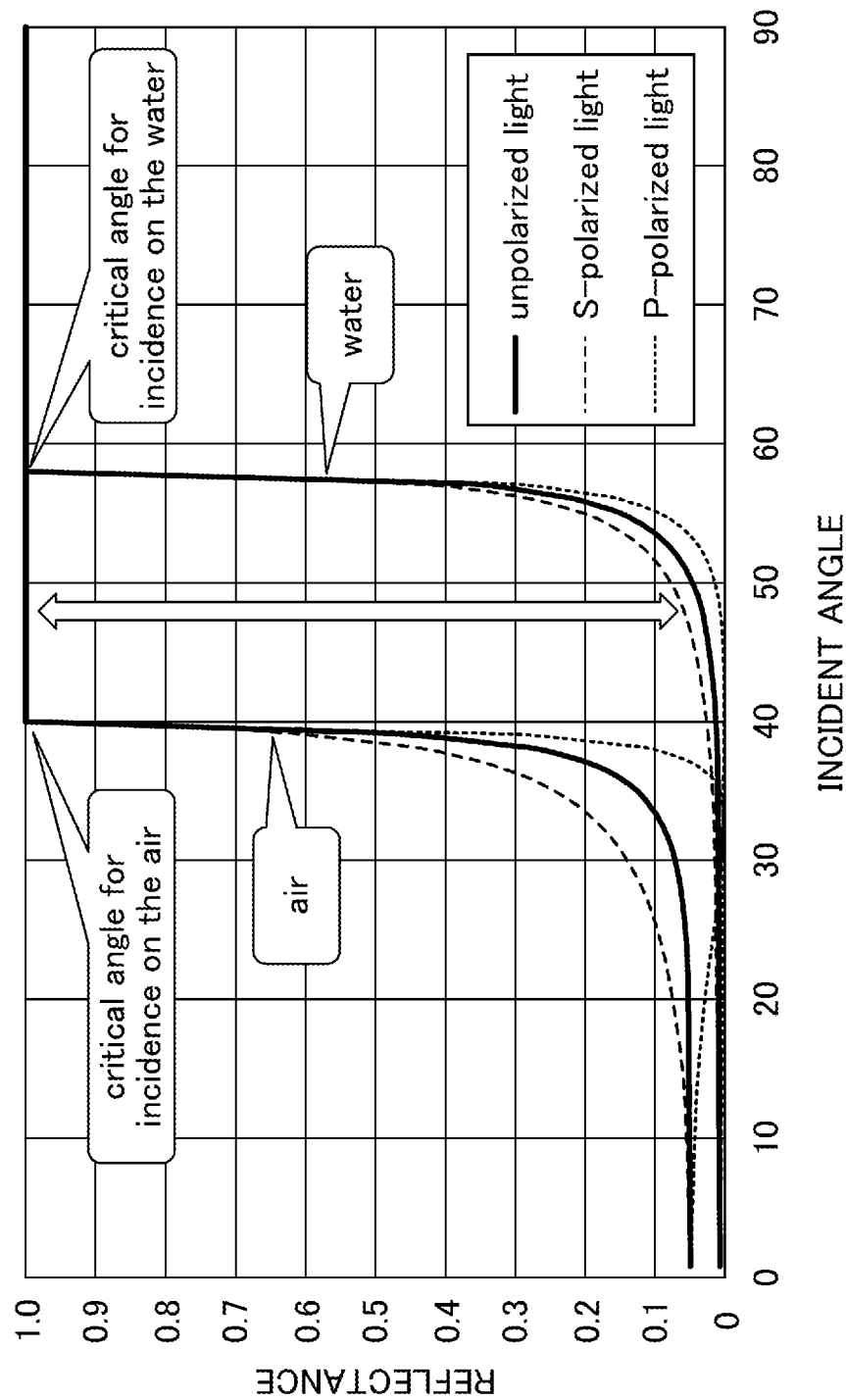
FIG. 2 shows incident-angle dependence of reflectance without protective coating.

FIG. 2 shows the incident-angle dependence of the reflectance without a protective film. As shown in FIG. 1, the incident angle is an angle between the light beam incident onto the sensing surface SS from the light source LS and the normal to the sensing surface SS. The solid line in FIG. 2 represents the reflectance with respect to unpolarized light, the dashed line represents the reflectance with respect to S-polarized light, and the fine dotted line represents the reflectance with respect to P-polarized light. The reflectance with respect to the unpolarized light is the average of those for S polarization and P polarization. Since the light source LS in FIG. 1 is an unpolarized light emitting diode or the like, the solid line represents the reflectance in the configuration of FIG. 1. The optical cover OC is made of polycarbonate having a refractive index of 1.57 with respect to near infrared rays.

The reflectance differs greatly between water and air in the range from 40° to 52° of incident angle. The sensing surface SS in FIG. 1 shows the effective sensing region that covers the above-noted range of incident angle. The shape or the eccentricity of the optical cover OC is determined such that the area of the sensing surface SS is maximized. The presence and the amount of water droplets are estimated based on the change in the quantity of light detection which occurs upon falling of water droplets onto the sensing surface SS.

Figure 3:
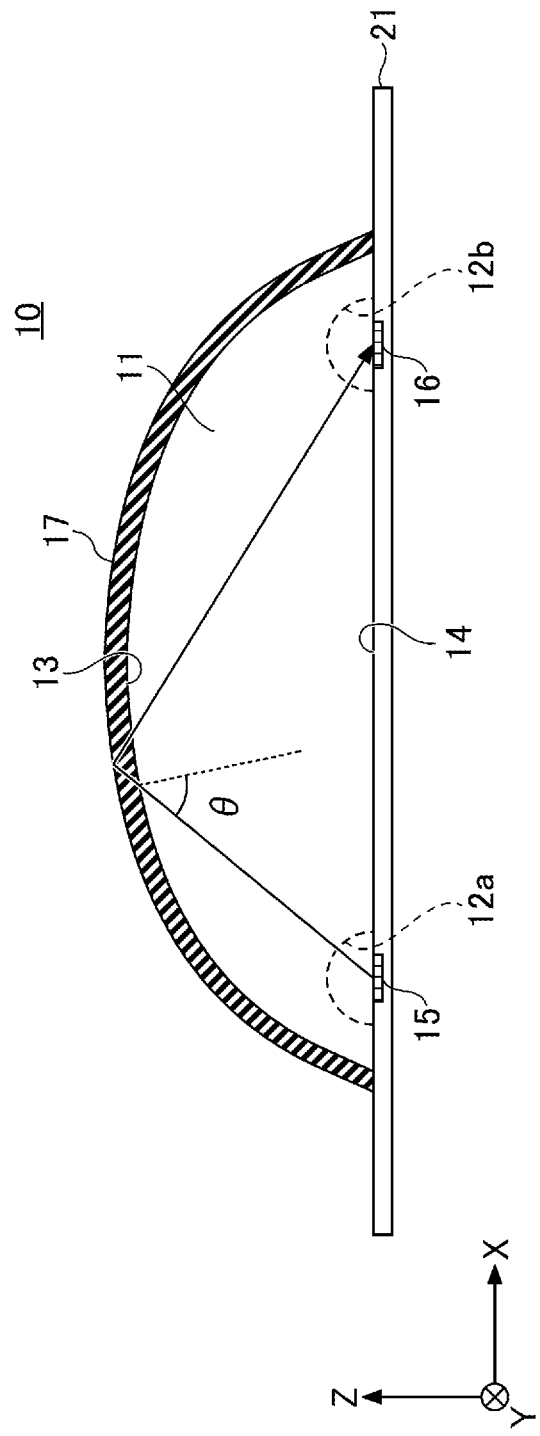
FIG. 3 is a schematic diagram of a droplet sensor according to an embodiment.

FIG. 3 is a schematic diagram of a droplet sensor 10 according to an embodiment. The droplet sensor 10 has an optical cover 11 having a curved surface 13, a protective film 17 covering the curved surface 13, a light emitting device 15, and a photosensitive device 16. The light emitting device 15 and the photosensitive device 16 are provided in a bottom surface 14 which faces the curved surface 13. The light emitting device 15 is an example of the light source, and the photosensitive device 16 is an example of the photodetector. The light emitting device 15 and the photosensitive device 16 may be formed on the same substrate 21.

The optical cover 11 is a solid cover which forms a part of a spheroid, and is made of a material transparent to the wavelength of the sensing light emitted from the light emitting device 15. In the example of FIG. 3, a solid spheroid is obtained by rotating an ellipse having a major axis and a minor axis in the X direction and the Y direction, respectively, around the major axis (X axis). The optical cover 11 has a shape obtained by cutting the spheroid along a plane parallel to the XY plane. The curved surface 13 is indicative of the surface shape of the spheroid. The height direction of the optical cover 11 is the Z direction.

The light emitting device 15 is, for example, a light emitting diode (LED) emitting near-infrared light, and is provided at the first focal point of an ellipse of the bottom surface 14 of the solid, i.e., a part of the spheroid. The photosensitive device 16 has sensitivity to light in the near infrared region, and is provided at the second focal point of the ellipse of the bottom surface 14.

A spherical space (or cavity) 12a may be provided around the first focal point at which the light emitting device 15 is provided. Such a space 12a may be formed by hollowing out a portion of the optical cover 11. Similarly, a spherical space (or cavity) 12b may be provided around the second focal point at which the photosensitive device 16 is provided. Such a space 12b may be formed by hollowing out a portion of the optical cover 11. By providing the spherical spaces 12a and 12b, refraction of light can be avoided at the interface between the space 12a or 12b and the optical cover 11 when the light beam output from the light emitting device 15 is incident onto the optical cover 11, or when the light beam totally reflected at the interface between the protective film 17 and the external medium enters the photosensitive device 16 through the optical cover 11 and the space 12b.

The protective film 17 is formed of a material which is transparent to the wavelength of the sensing light used and is capable of sufficiently protecting the optical cover 11 from the surrounding environment. The material of the protective film 17 is selected so that a significant reflectance difference is maintained between air and water in a predetermined range of incident angle of the sensing light, even when the optical cover 11 is covered with the protective film 17.

In the present application, the term "protective film" means a film for protecting the detection surface of the droplet sensor 10 from external physical or optical stimulus, and is distinguished from a functional coating for actively controlling the transmittance, reflectance, or other optical properties. In general, a coating film provided for the purpose of control the transmittance or the reflectance has a multilayer structure including several thin films, each having an optical path length corresponding to a half or quarter wavelength ($\lambda/2$ or $\lambda/4$) of the light emitting device. On the other hand, the protective film preferably has a thickness of several microns to several tens of microns, which is much thicker than the typical coating film for controlling the transmittance or the reflectance. Such a thick protective film provides an optical path length difference of several times to several-ten times longer than the wavelength of, for example, 860-nanometer sensing light. With such a thick protective film, interference due to difference in optical path length hardly occurs, and the transmittance or the reflectance is hardly affected. Examples of external physical stimulus include collisions and friction with other substances. Examples of optical stimulus include change of color (or discoloration) and deterioration due to exposure to light rays including sunlight.

The protective film 17, may be formed of a metal oxide transparent to the near-infrared light, such as $ZrO_2$, $TiO_2$, $Al_2O_3$, or a sintered compound (ceramic) thereof. Alternatively, a mixture of a filler and one or more of these metal oxides may be used for the protective film. Other materials containing a glass material (such as silica glass or quartz glass), a nitride (such as aluminum nitride or silicon nitride), a carbide (such as silicon carbide or boron carbide), or a polymer material (such as an acrylic resin) may also be used as the protective film 17.

The refractive index of the $ZrO_2$ coating agent with respect to near infrared light can be tuned in the range from 1.53 to 1.76. The refractive index of the $TiO_2$ coating agent with respect to near-infrared light can be tuned in the range from 1.53 to 1.90. The refractive index of widely used fine particles $ZrO_2$ with respect to near-infrared light is 1.62, and the refractive index of fine particles $ZrO_2$ mixed with a UV cut filler, with respect to near-infrared light is 1.64. In the following description, the term "refractive index" refers to the refractive index at the wavelength of the sensing light unless otherwise specified.

As will be described later, if the refractive index of the protective film 17 is higher than the refractive index of the liquid to be detected, droplets can be detected with the same theory and behavior as those in a configuration without a protective film. That is, the droplet sensing region is defined as a range of incident angle $\theta_i$ onto the curved surface 13 in which the incident light is totally reflected at the interface between the protective film 17 and a gas, while not being totally reflected at the interface between the protective film 17 and a liquid.

If the refractive index of the protective film 17 is higher than the refractive index of the gas being in contact with the protective film 17, and is lower than the refractive index of the liquid to be detected, then the range of incident angle for detecting droplets is slightly narrowed. However, droplets can be still detected effectively in the same manner as in a droplet sensor without a protective film, within the narrowed range of the incident angle.

In the following, an effective sensing region will be considered for separate cases based on the relative relationship of the refractive indexes of the protective film 17 and other substances involved in the sensing. It is assumed that the refractive index of the optical cover 11 is $n_1$, the refractive index of the protective film 17 is $n_2$, the refractive index of the surrounding gas is $n_0$, and the refractive index of the liquid to be detected is $n_0'$. The following four cases are considered based on the relative relationships of the refractive indexes.

(1) $n_0 < n_0' < n_1 < n_2$
(2) $n_0 < n_0' < n_2 < n_1$
(3) $n_0 < n_2 < n_0' < n_1$
(4) $n_2 < n_0 < n_0' < n_1$

These four cases are considered when the relationship of the refractive indexes $n_0 < n_0' < n_1$ is unchanged, while the refractive index $n_2$ with respect to the other refractive indexes is changed.

[CASE 1: $n_0 < n_0' < n_1 < n_2$]

Figure 4:
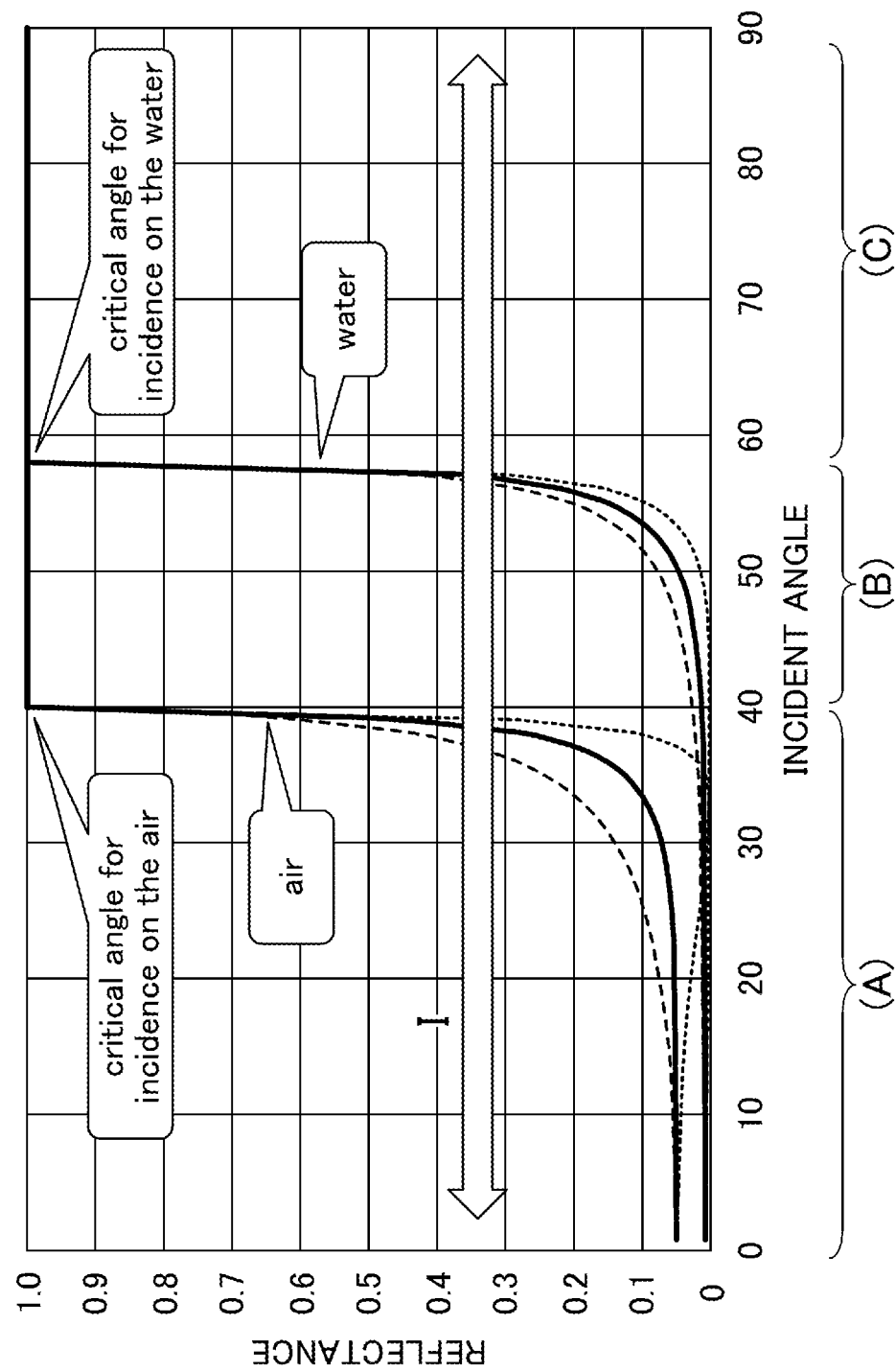
FIG. 4 shows an applicable range of the incident-angle dependence of reflectance in Case 1.

FIG. 4 shows the applicable range of the incident-angle dependence of the reflectance in Case 1. As in FIG. 2, the solid line represents the reflectance with respect to unpolarized light, the dashed line represents the reflectance with respect to S-polarized light, and the fine dotted line represents the reflectance with respect to P-polarized light. In Case 1, the refractive index $n_0$ of air, the refractive index $n_0'$ of water, the refractive index $n_1$ of the optical cover 11, and the refractive index $n_2$ of the protective film 17 increase in this order. Specifically, the refractive index $n_0$ of air is 1.00, the refractive index $n_0'$ of water is 1.33, the refractive index $n_1$ of the optical cover 11 is 1.57, and the refractive index $n_2$ of the protective film 17 is 1.60. No total internal reflection occurs between the optical cover 11 and the protective film 17, and therefore, there is no limitation to the incident angle of the light beam onto the curved surface 13, and the same behavior as in the configuration without the protective film is maintained over the entire range from 0° to 90°. Light is refracted upon entering the protective film 17 due to the difference in the refractive index, but the range of the incident-angle onto the interface at the optical cover 11 for the total internal reflection conditions with respect to air and water does not change, regardless of the presence or the absence of the protective film 17, as long as the protective film 17 has a uniform thickness. Here, it is assumed that the protective film 17 has a uniform thickness. The zone in which the same behavior as the sensor without the protective film is maintained is referred to as "Zone I".

Zone I in which the same behavior as the sensor without the protective film is maintained is divided into three regions (A), (B), and (C). In region (A), almost no reflection occurs with respect to air or water. The region (B) is between the critical angle with respect to air and the critical angle with respect to water, in which reflectance difference of 0.90 (90%) or higher can be secured between air and water. The region (B) provides an area capable of sensing similarly to the sensor without a protective film, but with improved durability and weather resistance. On the other hand, in region (C), total internal reflection occurs with respect to both air and water. The same behavior as in the configuration without the protective film is observed in Zone I over the entire range of incident angle from 0° to 90°. In Zone I, a specific range within the region (B) in which a sufficient reflectance difference is secured between water and air is used as the sensing region to detect water droplets attaching to the sensor.

Figure 5A:
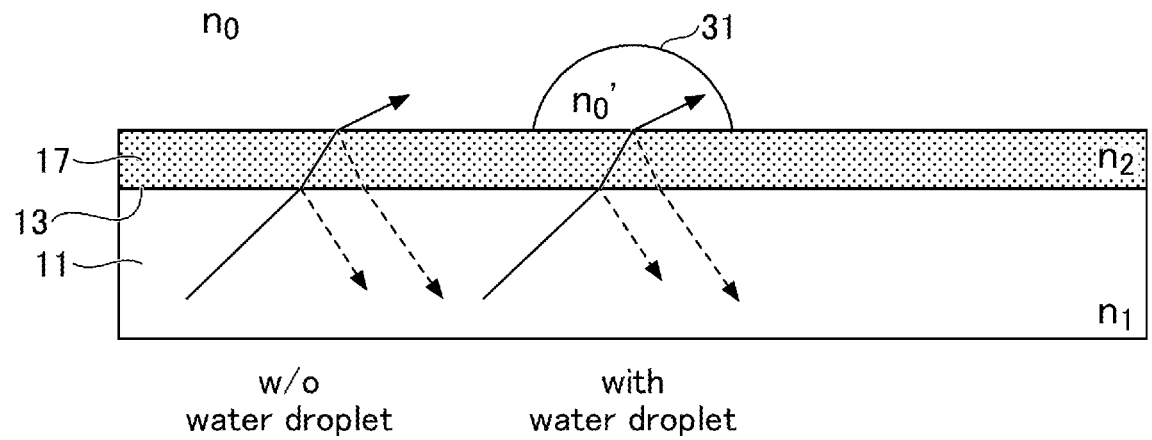
FIG. 5A is a schematic diagram illustrating a behavior in region (A) of FIG. 4.

FIG. 5A schematically illustrates a behavior in the region (A) of FIG. 4. The solid arrow in the figure indicates the direction of refraction or reflection of light, and the dashed arrow indicates the direction of specular reflection of a portion of light at the interface. In the region (A), the reflectance at the interface is about 5' or less, and is very low for both air and water. The light emitted from the light emitting device 15 (see FIG. 3) passes through the interface between the optical cover 11 and the protective film 17, and exits into the air from the protective film 17. At the location where the water droplet 31 is present, the light that has passed through the interface between the optical cover 11 and the protective film 17 enters the water droplet 31 from the protective film 17. No total internal reflection occurs at the interface with the air or the water, and the reflected light is hardly detected by the photosensitive device 16. A small quantity of specular reflection (indicated by the dashed arrow) occurring at the interface due to the difference in refractive index is hardly detected by the photosensitive device 16, and does not affect the sensing operation. In the region (A), no light is detected, regardless of with or without water droplets, so the incident angles in the region (A) are not used for sensing.

Figure 5B:
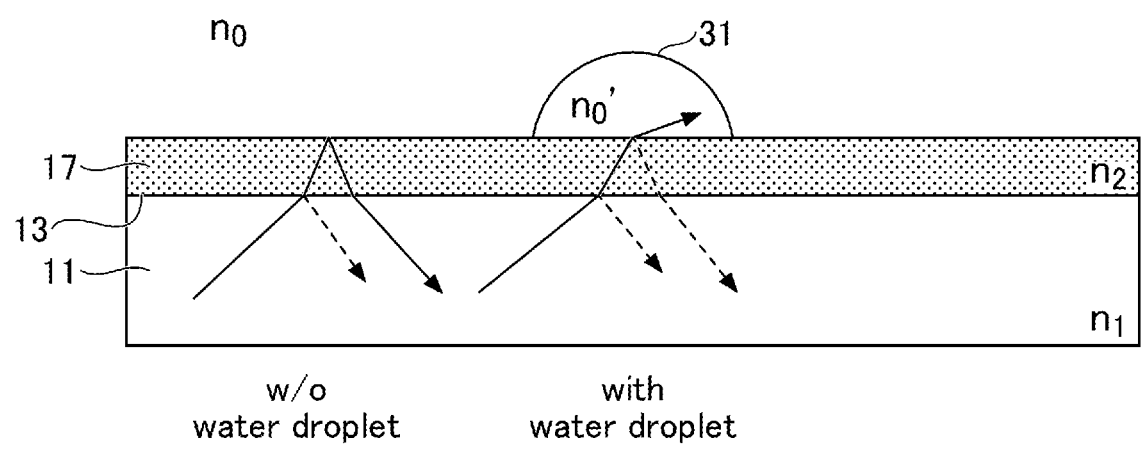
FIG. 5B is a schematic diagram illustrating a behavior in region (B) of FIG. 4.

FIG. 5B schematically illustrates the behavior in the region (B) of FIG. 4. In the region (B), the light emitted from the light emitting device 15 passes through the interface between the optical cover 11 and the protective film 17 at a small refraction angle, and is totally reflected at the interface between the protective film 17 and the air. The totally reflected light returns to and is refracted at the interface between the protective film 17 and the optical cover 11 at a small incident angle, and is incident on the photosensitive device 16. The film thickness of the protective film 17 is about several microns to several tens of microns. Even if the optical path of the return light changes due to the refraction, it is still within the area of the light receiving surface of the photosensitive device 16, and thus the return light is detected. The position of the photosensitive device 16 may be slightly offset from the focal point, or the spherical surface of the space 12b (see FIG. 3) surrounding the photosensitive device 16 may be used as a scattering surface.

At the location where the water droplet 31 is present, the light enters the water droplet 31 from the protective film 17, without being totally reflected at the interface. The presence of the water droplet 31 is detected by the change in the quantity of light received by the photosensitive device 16. The region (B) is a sensing region capable of detecting the water droplet 31 using the difference in reflectance between water and air.

Figure 5C:
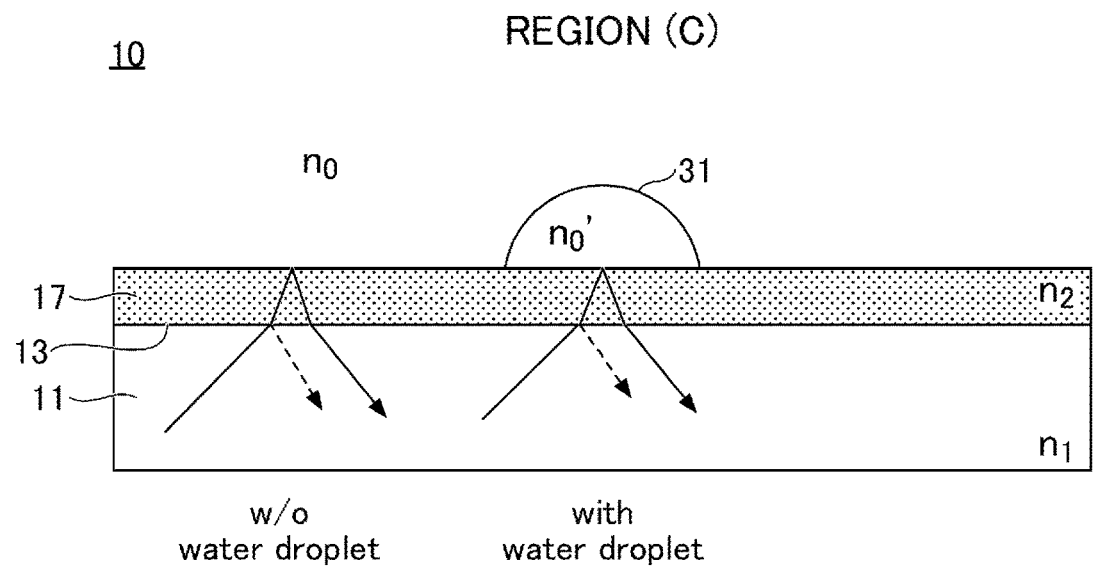
FIG. 5C is a schematic diagram illustrating behavior in region (C) of FIG. 4.

FIG. 5C schematically illustrates the behavior in region (C) of FIG. 4. In the region (C), the light emitted from the light emitting device 15 (see FIG. 3) passes through the interface between the optical cover 11 and the protective film 17, and totally reflected at the interface between the protective film 17 and the external medium such as air or water, regardless of the presence or absence of the water droplet 31 on the protective film 17. In the region (C), the quantity of light received at the photosensitive device 16 does not change, regardless of whether water droplets have attached on the sensor, and accordingly, this range of incident angles is not used for detection of water droplets. However, the eccentricity of the elliptical shape shown in FIG. 1 is designed such that region (C) in which total internal reflection occurs does not exist. In FIG. 1, the maximum incident angle is acquired at the zenith, and incidence to the zenith corresponds to the region (B). The optical cover 11 of FIG. 3 can also be designed so as to have an elliptical shape with an eccentricity that eliminates the region (C).

Figure 6:
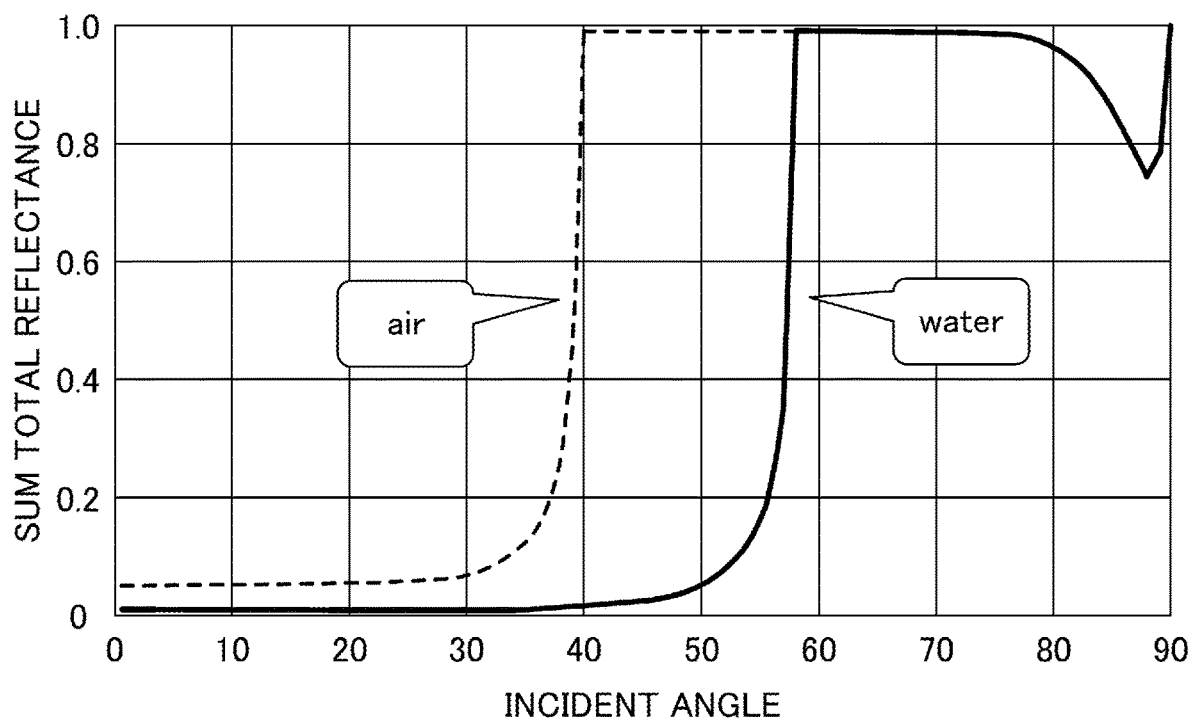
FIG. 6 shows the incident-angle dependence of sum total reflectance with respect to the air and the water under the conditions of Case 1.

FIG. 6 shows the incident-angle dependence of sum total reflectance of the droplet sensor 10 with respect to air and water under the condition of Case 1. The thick solid line represents the sum total reflectance of water with respect to unpolarized light, and the dashed line represents the sum total reflectance of air with respect to the unpolarized light. The sum total reflectance is calculated as shown in FIG. 7.

Figure 7:
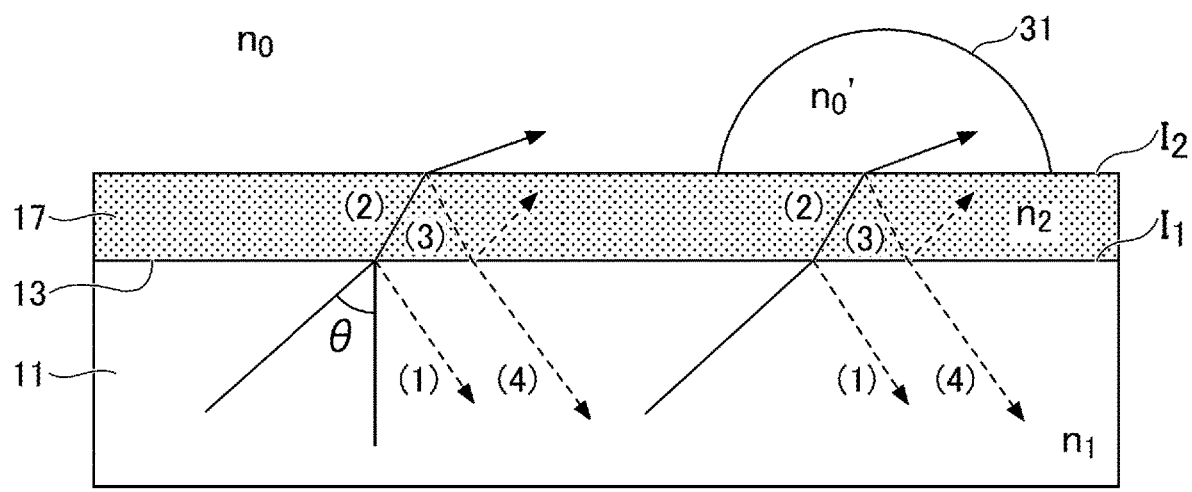
FIG. 7 illustrates how to determine the sum total reflectance.

In FIG. 7, the refractive index $n_0$ of air is 1.00, the refractive index $n_0'$ of water is 1.33, the refractive index $n_1$ of the optical cover 11 is 1.57, and the refractive index $n_2$ of the protective film 17 is 1.60. The interface between the optical cover 11 and the protective film 17 is denoted as $I_1$, and the interface between the protective film 17 and the external medium is denoted as $I_2$. The interface $I_1$ corresponds to the curved surface 13 of FIG. 3.

Of the light incident onto the interface $I_1$ at the incident angle θ, the component reflected at the interface $I_1$ is referred to as a reflected component (1), and the component passing through the interface $I_1$ is referred to as a transmitted component (2). Of the transmitted component (2), the light reflected at the interface $I_2$ is referred to as the reflected component (3). Of the reflected component (3), the light passing through the interface $I_1$ and returning to the optical cover 11 is referred to as the transmitted component (4).

The sum total reflectance is roughly calculated by (1)+(2)×(3)×(4). Among the components (1) to (4), the reflected component (3) causes a difference in the incident-angle dependence of reflectance or transmittance, depending on whether the external medium is air or water. The incident-angle dependence of reflectance or transmittance of the components (1), (2), and (4) is constant, regardless of the presence or absence of the water droplet 31. In this context, the attenuation due to absorption is ignored, and interference and multiple reflections occurring in the film are not considered.

Returning to FIG. 6, the profile of the incident-angle dependence of sum total reflectance under the condition of Case 1 and with the protective film 17 is compared with the profile of the incident-angle dependence of the reflectance shown in FIG. 2 without the protective film. These two profiles are almost the same, except for the drop in the sum total reflectance near 90°. It is understood that the droplet sensor 10 having the protective film 17 can behave substantially in the same manner as a sensor without the protective film at the incident angle θ onto the curved surface 13 ranging from 0° to near 90°. The range in which the incident angle of light entering the interface between the protective film 17 and the external medium is greater than the critical angle for gas, and is equal to or less than the critical angle for a liquid, can be used as the sensing region. In the practical use, the range of the incident angle onto the curved surface of the ellipse is from 0° (the apex on the long axis, that is, the left and right ends of the optical cover 11 in FIG. 3) to about 51° (the apex on the short axis or the zenith of the optical cover 11).

[CASE 2: $n_0 < n_0' < n_2 < n_1$]

Figure 8:
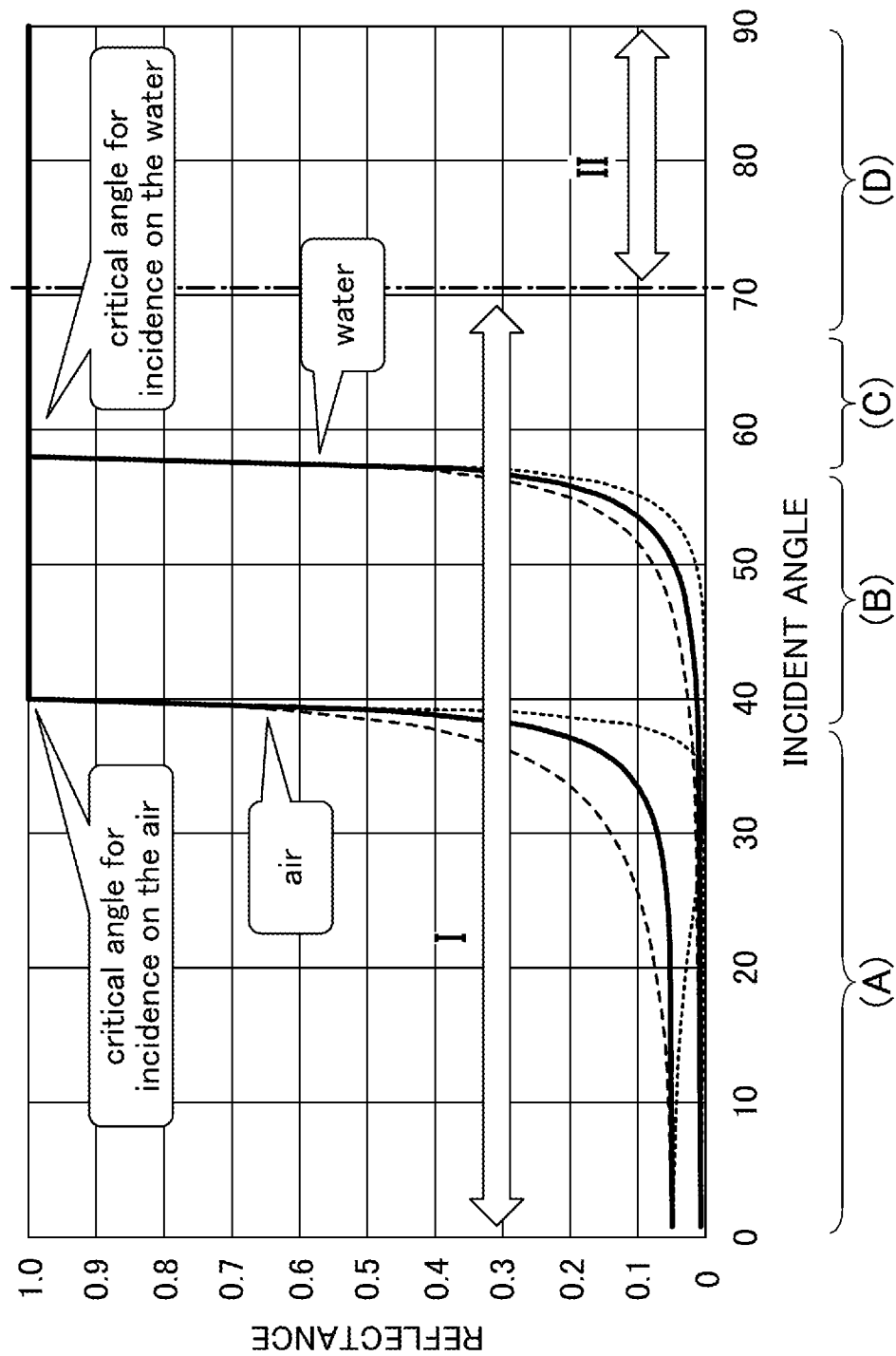
FIG. 8 shows an applicable range of the incident-angle dependence of reflectance in Case 2.

FIG. 8 shows the applicable range of the incident-angle dependence of the reflectance in Case 2. In Case 2, the refractive index $n_2$ of the protective film 17 is smaller than the refractive index $n_1$ of the optical cover 11, and is greater than the refractive index $n_0'$ of a liquid to be detected. Similar to Case 1, the refractive index $n_0$ of air is 1.00, the refractive index $n_0'$ of water is 1.33, and the refractive index $n_1$ of the optical cover 11 is 1.57. The protective film 17 is formed of, for example, gallium oxide, and its refractive index $n_2$ is about 1.45.

Because the refractive index $n_2$ of the protective film 17 is lower than the refractive index $n_1$ of the optical cover 11, the light incident on the interface between the optical cover 11 and the protective film 17 at an incident angle exceeding the critical angle is totally reflected at the interface. In the range of incident angle not exceeding the critical angle, namely, in the range of incident angle θ not exceeding $\sin^{-1}(n_2/n_1)$, the same behavior as in the configuration without the protective film is maintained. That is, when the sensing surface is in contact with air, the light is totally reflected at the interface between the protective film 17 and the air. With a water droplet attaching onto the sensing surface, the light is not totally reflected at the interface, and the water droplet can be detected based on the change in the reflectance. With the incident angle onto the protective film 17 exceeding the critical angle 17, total internal reflection occurs at the interface between the optical cover 11 and the protective film 17, and the surface state of the protective film 17 cannot be detected. With $n_1=1.57$ and $n_2=1.48$, the critical angle is about 70°. The incident angle onto the curved surface 13 ranging from 0° to about 70° is defined as "Zone I". The range of incident angle exceeding 70° is referred to as "Zone II" which provides a new behavior of total internal reflection occurring at the interface between the optical cover 11 and the protective film 17 (i.e., at the curved surface 13).

Zone I is divided into three regions (A), (B), and (C), as in case 1. In the region (A), almost no reflection occurs with respect to air or water, and light enters the external medium. In the region (B), the difference in reflectance between air and water is significant. The region (B) is used as the effective sensing region, as in the configuration without the protective film, but with the improved durability and weather resistance. In the region (C), total internal reflection occurs at the surface of the protective film 17 with respect to both air and water. In Zone I, the sensing behavior is the same as that in the configuration without the protective film, within the range of incident angle from 0° to about 70°, and the region (B) having a significant reflectance difference serves as the sensing region to detect the presence or absence of water droplets. In the region (D) which corresponds to Zone II, total internal reflection occurs at the interface between the optical cover 11 and the protective film 17, and accordingly, the light does not reach the outer surface of the protective film 17. The region (D) cannot be used for detection.

Figure 9:
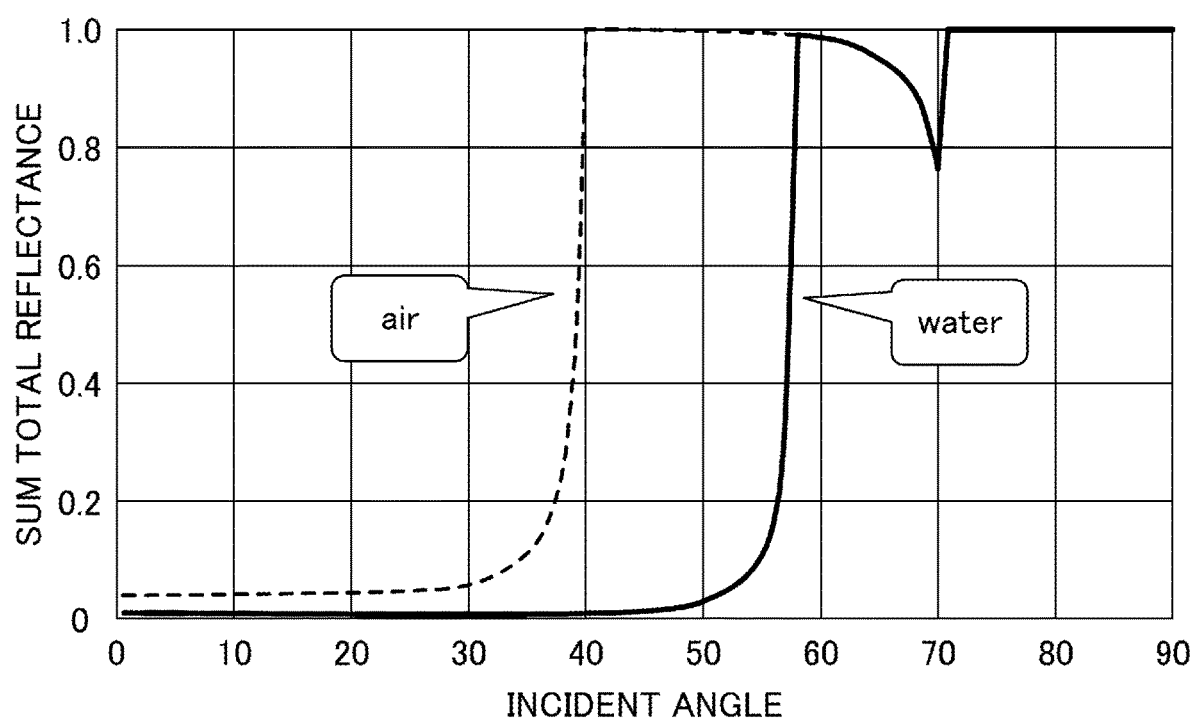
FIG. 9 shows the incident-angle dependence of sum total reflectance with respect to the air and the water under the conditions of Case 2.

FIG. 9 shows the incident-angle dependence of sum total reflectance with respect to air and water in Case 2. The sum total reflectance is calculated by (1)+(2)×(3)×(4), as has been explained with reference to FIG. 7, based on the reflected component (1) and the transmitted component (2) at the interface $I_1$, the reflected component (3) at the interface $I_2$, and the transmitted component (4) returning to and passing through the interface $I_1$.

Comparing the profile of the incident-angle dependence of sum total reflectance in FIG. 9 with the profile of the incident-angle dependence of reflectance of FIG. 2 without the protective film, the two profiles are almost the same, except for the drop in the sum total reflectance near the critical angle of 70°. However, unlike FIG. 2, the total internal reflection at the incident angle exceeding 70° is one occurring the interface between the optical cover 11 and the protective film 17, and accordingly, the behavior is different.

In Case 2, the droplet sensor 10 with the protective film 17 operates in the same manner as the configuration without the protective film within the range of incident angle θ onto the curved surface 13 equal to or smaller than the critical angle with respect to the protective film 17 (in this example, the range from 0° to 70°). Within this range, the region (B) can be used as the sensing region.

Figure 10A:
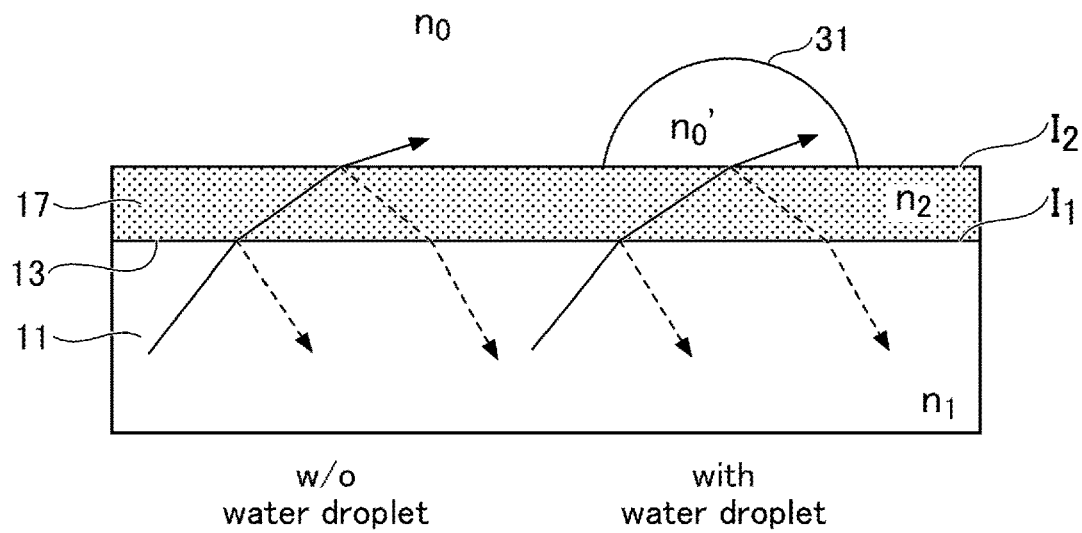
FIG. 10A is a schematic diagram illustrating behavior in region (A) of FIG. 8.

FIG. 10A schematically illustrates a behavior in the region (A) of FIG. 8. In the region (A), the light emitted from the light emitting device 15 (see FIG. 3) exits the droplet sensor 10 through the protective film 17, regardless of the presence or absence of the water droplet 31 on the protective film 17. Total internal reflection does not occur with respect to either air or water, and this region is not applicable to the sensing making use of the change in reflectance.

Figure 10B:
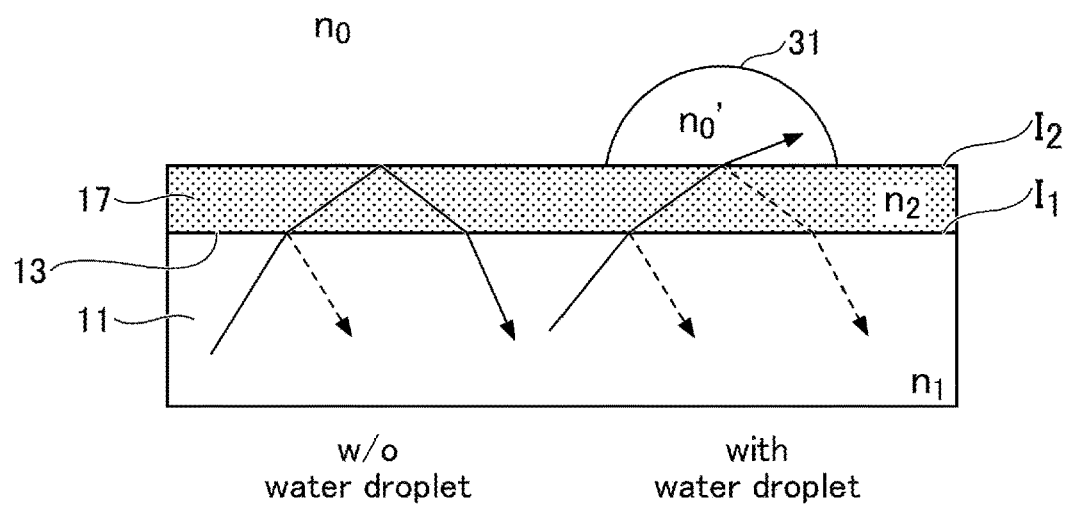
FIG. 10B is a schematic diagram illustrating behavior in region (B) of FIG. 8.

FIG. 10B schematically illustrates the behavior in the region (B) of FIG. 8. In the region (B), the light emitted from the light emitting device 15 passes through the interface between the optical cover 11 and the protective film 17, and is totally reflected at the interface between the protective film 17 and the air. The totally reflected light is refracted at the interface between the protective film 17 and the optical cover 11, and incident on the photosensitive device 16.

At the location where the water droplet 31 attaches, most of the light having passed through the interface between the optical cover 11 and the protective film 17 enters the water droplet 31 from the protective film 17, and almost no light is detected at the photosensitive device 16. The presence of the water droplet 31 is detected as the change in the quantity of light received at the photosensitive device 16.

Figure 10C:
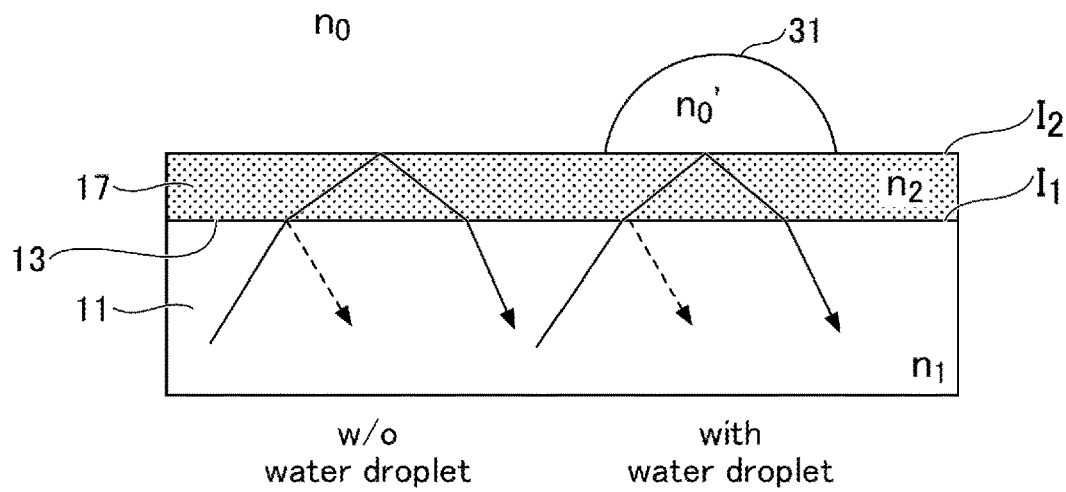
FIG. 10C is a schematic diagram illustrating behavior in region (C) of FIG. 8.

FIG. 10C schematically illustrates the behavior in the region (C) of FIG. 8. In the region (C), the light emitted from the light emitting device 15 is totally reflected at the interface between the protective film 17 and the external medium, regardless of the presence or absence of the water droplet 31 on the protective film 17. The quantity of light received at the photosensitive device 16 does not change even if water droplets have attached onto the protective film 17, and therefore, the incident angle range of the region (C) is not used for sensing.

Figure 10D:
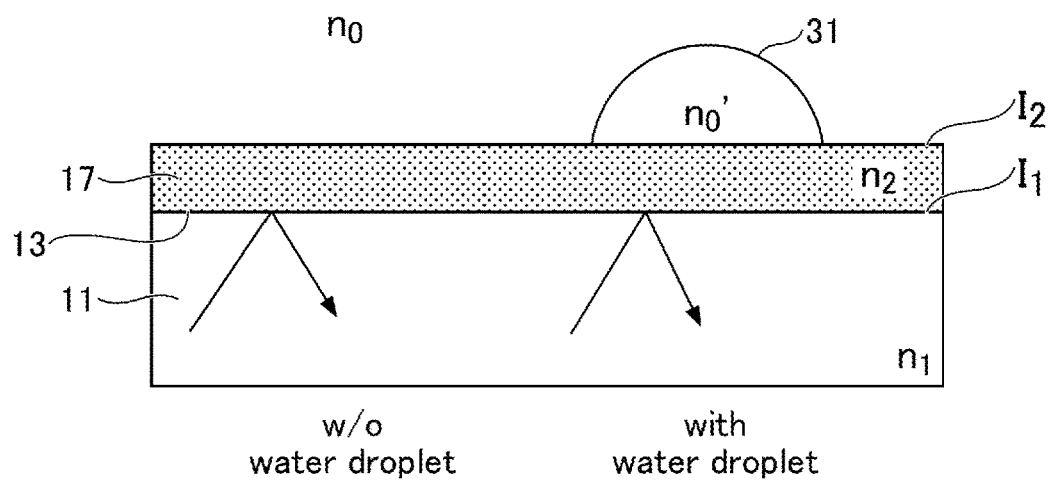
FIG. 10D is a schematic diagram illustrating behavior in region (D) of FIG. 8.

FIG. 10D schematically illustrates the behavior in the region (D) of FIG. 8. In the region (D), the incident angle is greater than the critical angle of 70°, and the light emitted from the light emitting device 15 is totally reflected at the interface between the optical cover 11 and the protective film 17. Since no light enters the protective film 17, the surface state of the protective film 17 cannot be detected.

Under the condition of Case 2, droplets can be effectively detected using the region (B) of Zone I, based on the same behavior as in the configuration without the protective film.

[CASE 3: $n_0 < n_2 < n_0' < n_1$]

Figure 11:
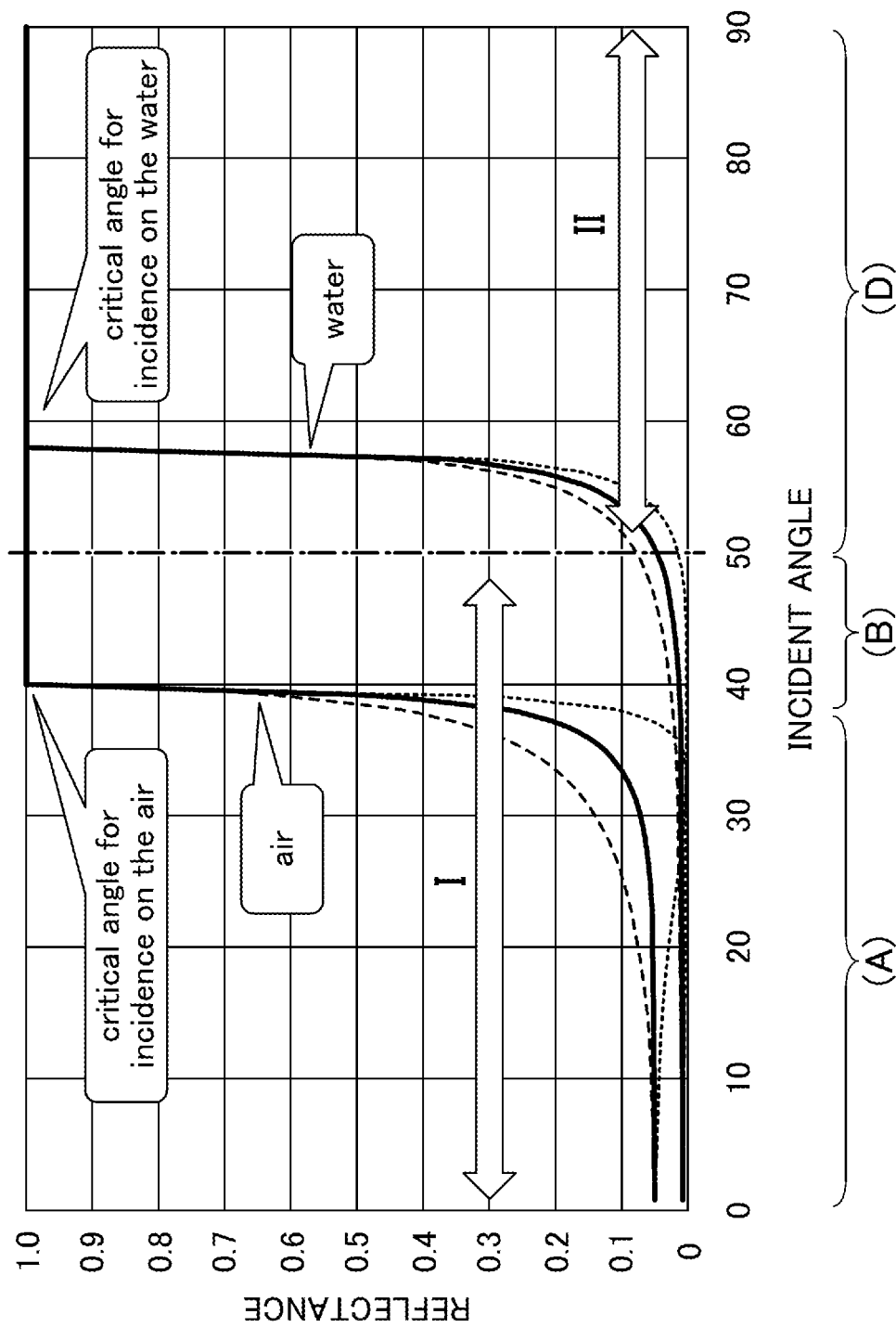
FIG. 11 shows an applicable range of the incident-angle dependence of reflectance in Case 3.

FIG. 11 shows the applicable range of the incident-angle dependence of the reflectance in Case 3. In Case 3, the refractive index $n_2$ of the protective film 17 is smaller than the refractive index $n_0'$ of a liquid to be detected, but is greater than the refractive index $n_0$ of the air. The liquid to be detected is a water droplet, and the refractive index $n_0'$ of water is 1.33. The refractive index $n_1$ of the optical cover 11 is 1.57, as in Case 1 and Case 2. The refractive index $n_2$ of the protective film 17 is, for example, 1.20.

In Case 3, Zone I is defined as the range in which the incident angle onto the curved surface 13 does not exceed the critical angle with respect to the protective film 17, in which the same behavior as in the configuration without the protective film is maintained. Assuming that $n_1$ equals 1.57 and $n_2$ equals 1.20, the critical angle determined by $\sin^{-1}(n_2/n_1)$ is about 50°. The range with the incident angle onto the curved surface 13 exceeding 50° is "Zone II" where total internal reflection occurs at the interface between the optical cover 11 and the protective film 17. Under the condition of Case 3, Zone II erodes the effective sensing region of the configuration without the protective film, making use of the reflectance difference.

Zone I is divided into region (A) and region (B). In the region (A), almost no reflection occurs with respect to air or water. In the region (B), the reflectance difference between air and water is 0.90 (90%) or higher. The region (B) can be used as the sensing region, in which the sensor behaves like a droplet sensor without a protective film, while providing improved durability and weather resistance, although the angle range available for sensing making use of the incident-angle dependence of reflectance is slightly narrowed, compared with the configuration without the protective film.

Zone II corresponds to the region (D). The region (D) cannot be used for sensing because total internal reflection occurs at the interface between the optical cover 11 and the protective film 17. Because the difference between the refractive index $n_2$ of the protective film 17 and the refractive index $n_1$ of the optical cover 11 increases, compared with Case 2, the sensing region (B) is narrowed.

Figure 12:
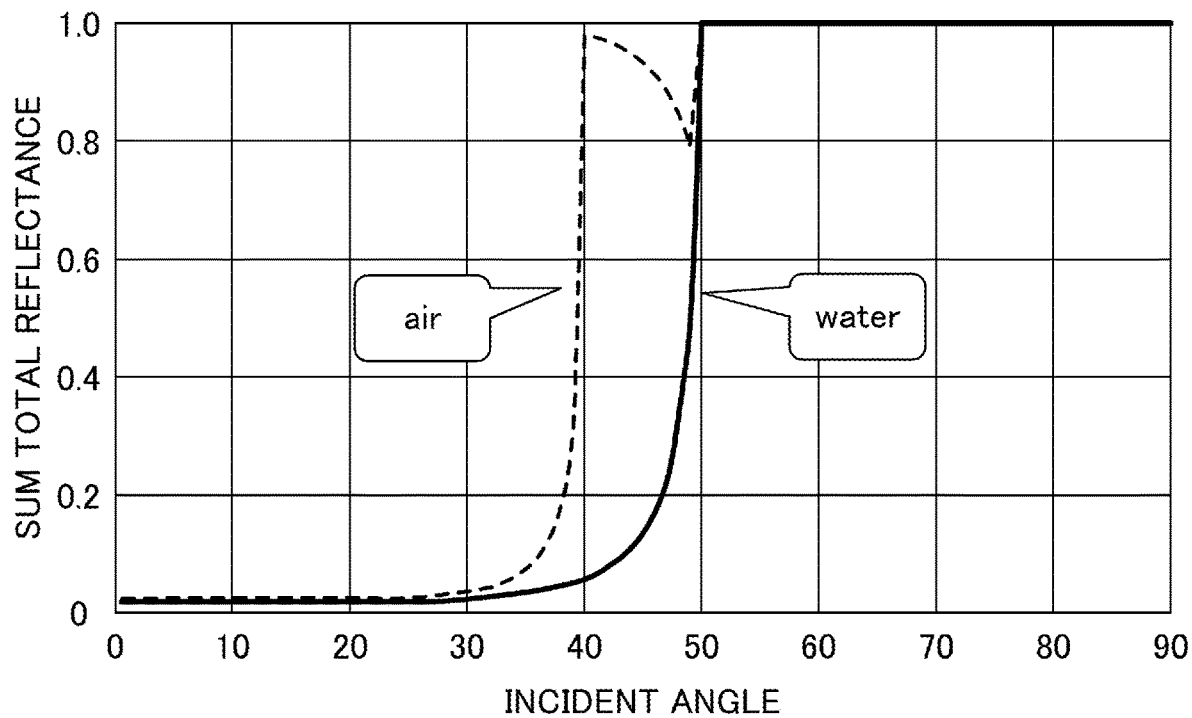
FIG. 12 is a diagram showing the incident-angle dependence of sum total reflectance with respect to the air and the water under the conditions of Case 3.

FIG. 12 shows the incident-angle dependence of sum total reflectance with respect to air and water in Case 3. The sum total reflectance is the same as that described with reference to FIG. 8, and is calculated by (1)+(2)×(3)×(4), using the reflected component (1) and the transmitted component (2) at the interface $I_1$, the reflected component (3) at the interface $I_2$, and the transmitted component (4) returning to and again passing through the interface $I_1$.

Comparing the profile of the incident-angle dependence of sum total reflectance of FIG. 12 with the profile of the incident-angle dependence of reflectance in the absence of the protective film in FIG. 2, a tendency similar to that of the configuration without the protective film is observed, except for the decline of the sum total reflectance near the incident angle of 50°. It should be noted that the sum total reflectance with respect to water and air in the range exceeding 50° is total internal reflection at the interface between the optical cover 11 and the protective film 17, based on the different behavior from that of FIG. 2. In the incident angle range equal to or less than 50°, the region available for the sensing with a sufficient reflectance difference between water and air is secured.

Under the condition of Case 3, the droplet sensor 10 having the protective film 17 operates in the same manner as the sensor without the protective film over the range of incident angle θ onto the curved surface 13 from 0° to near 50° (Zone I). Within this range, there is a specific region that can be used as the sensing region corresponding to the region (B) with the angle of incidence onto the curved surface 13 being 40° to 50°.

Figure 13A:
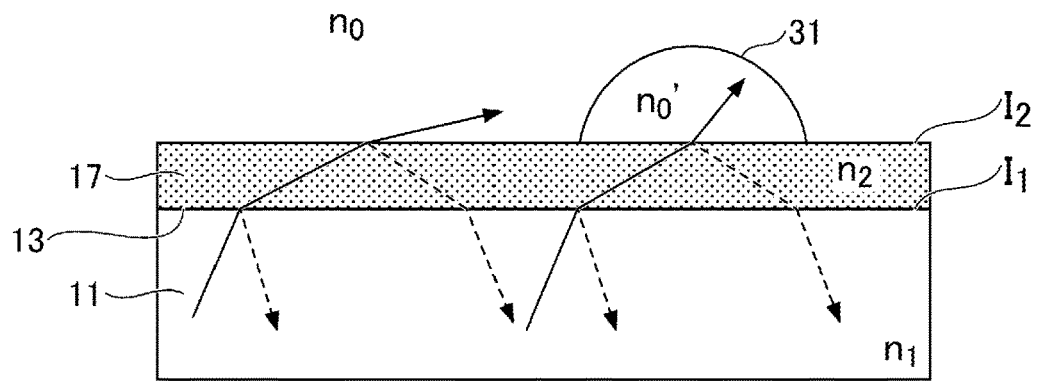
FIG. 13A is a schematic diagram illustrating behavior in region (A) of FIG. 11.

FIG. 13A schematically illustrates a behavior in the region (A) of FIG. 11. In the region (A), the light emitted from the light emitting device 15 (see FIG. 3) exits the droplet sensor 10 through the protective film 17, regardless of the presence or absence of the water droplet 31 on the protective film 17. Total internal reflection does not occur with respect to air or water, and this region is not applicable to the sensing making use of the changes in reflectance.

Figure 13B:
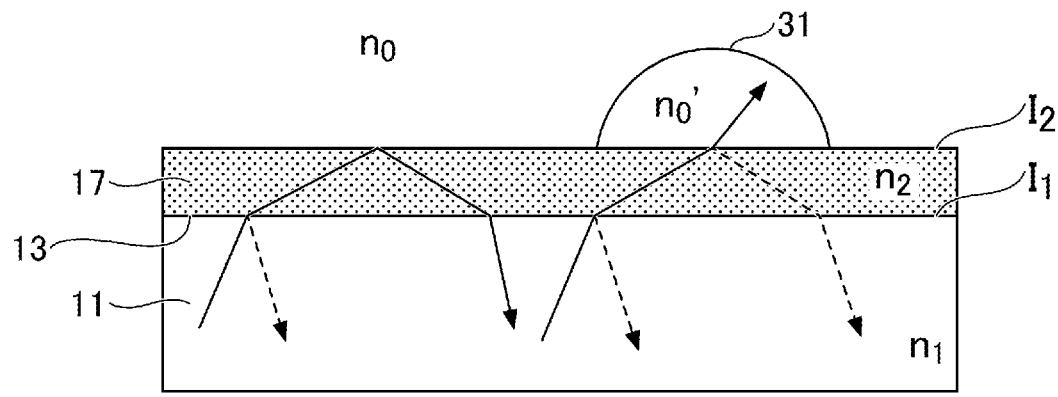
FIG. 13B is a schematic diagram illustrating behavior in region (B) of FIG. 11.

FIG. 13B schematically illustrates a behavior in the region (B) of FIG. 11. In the region (B), the light emitted from the light emitting device 15 passes through the interface between the optical cover 11 and the protective film 17, and is totally reflected at the interface between the protective film 17 and the air. The totally reflected light is refracted at the interface between the protective film 17 and the optical cover 11, and incident onto the photosensitive device 16.

At the location where the water droplet 31 has attached, most of the light having passed through the interface between the optical cover 11 and the protective film 17 enters the water droplet 31 from the protective film 17, and almost no light is detected at the photosensitive device 16. Thus, the water droplet 31 is detected by the change in the quantity of the received light.

Figure 13C:
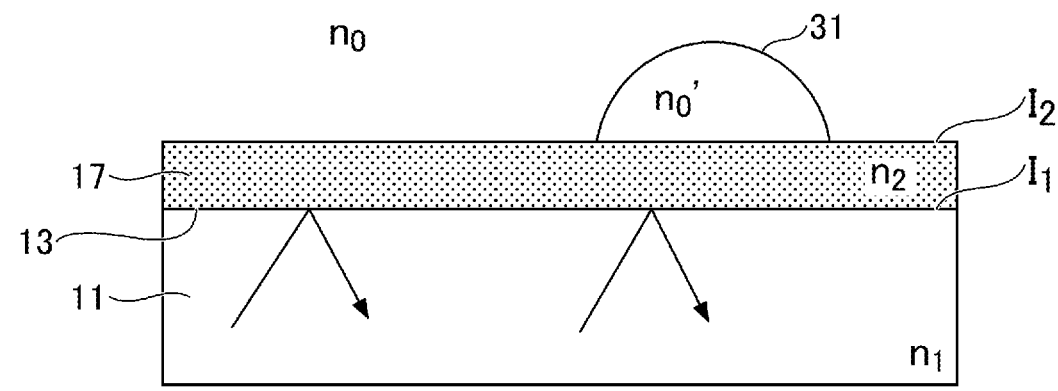
FIG. 13C is a schematic diagram illustrating behavior in region (D) of FIG. 11.

FIG. 13C schematically illustrates the behavior in the region (D) of FIG. 11. In the region (D), the light emitted from the light emitting device 15 is totally reflected at the interface between the optical cover 11 and the protective film 17, regardless of the presence or absence of water droplets 31 on the protective film 17. The water droplets on the surface of the protective film 17 cannot be detected because the light does not reach the surface of the protective film 17.

Under the conditions of Case 3, droplets can still be detected effectively, although the region (B) of Zone I, in which the droplet sensor 10 operates in the same manner as the configuration without the protective film, is limited compared with Case 1 and Case 2.

[CASE 4: $n_2<n_0<n_0'<n_1$]

Figure 14:
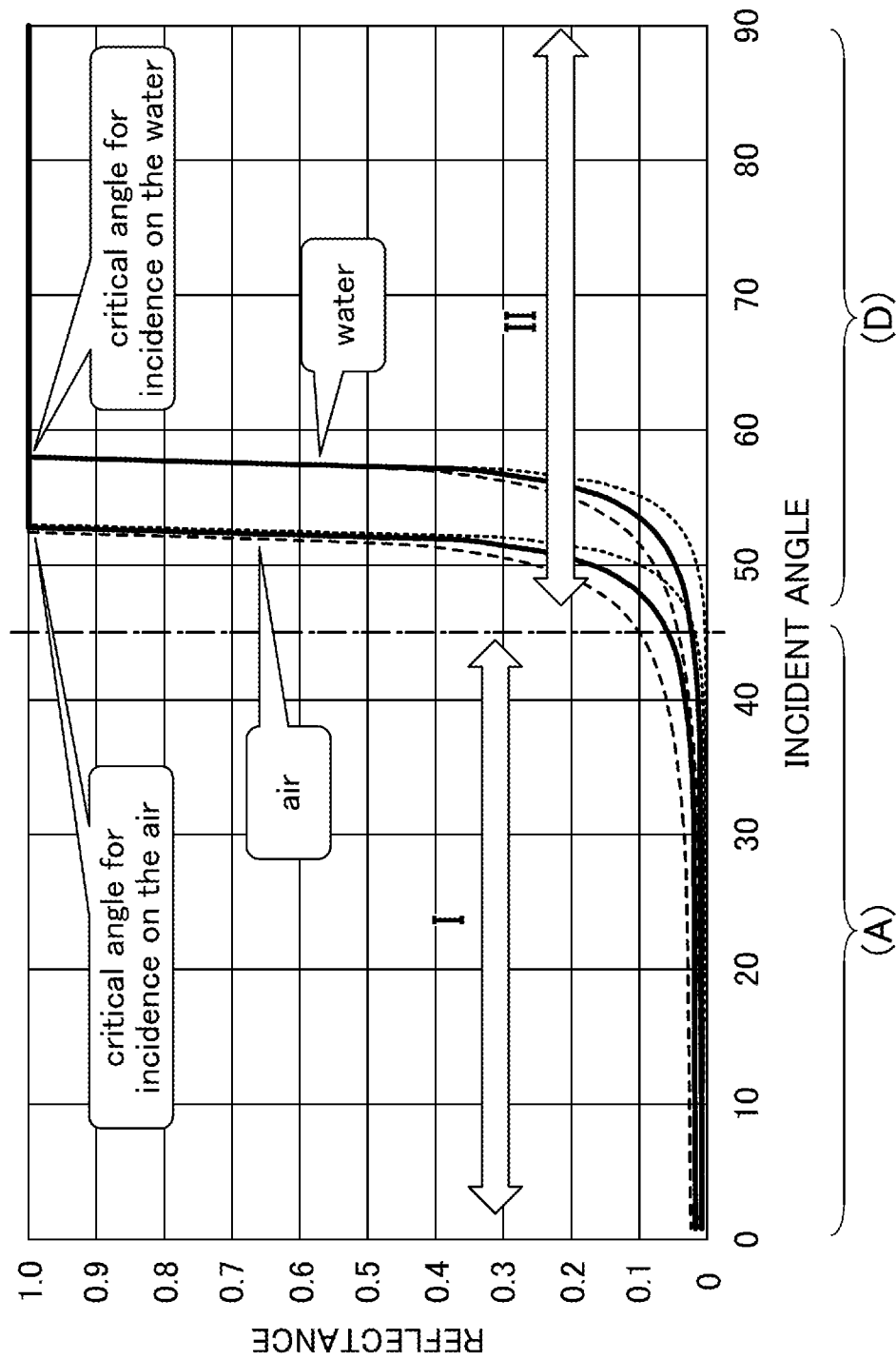
FIG. 14 shows an applicable range of the incident-angle dependence of reflectance in Case 4.

FIG. 14 shows the applicable range of the incident-angle dependence of the reflectance in Case 4. In Case 4, the refractive index $n_2$ of the protective film 17 is smaller than the refractive index $n_0$ of the air. Although it may be difficult to specify a solid medium having a refractive index lower than that of air, the refractive index $n_0$ of the external medium surrounding the protective film 17 is set to a virtual value of 1.25, and the refractive index $n_2$ of the protective film 17 is set to 1.10 for the calculation. In FIG. 14, the external medium is called "air" for the sake of convenience in accordance with Cases 1 to 3.

With $n_1=1.57$ and $n_2=1.10$ in Case 4, the critical angle determined by $\sin^{-1}(n_2/n_1)$ is 45°. The range of incident angle onto the curved surface 13 from 0° to 45° is Zone I, in which the droplet sensor 10 operates in the same manner as in the configuration without the protective film, and the range exceeding 45° is Zone II.

Because in Case 4 the refractive index $n_0$ of the external medium is virtually set to 1.25, the critical angle at the interface between the optical cover 11 without the protective film and the air is shifted to the vicinity of 52°. Without the protective film, all the area that should be capable of sensing using the reflectance difference between water and the external medium which models the air is included in Zone II. Zone I includes only the region (A), and Zone II includes only the region (D).

Figure 15:
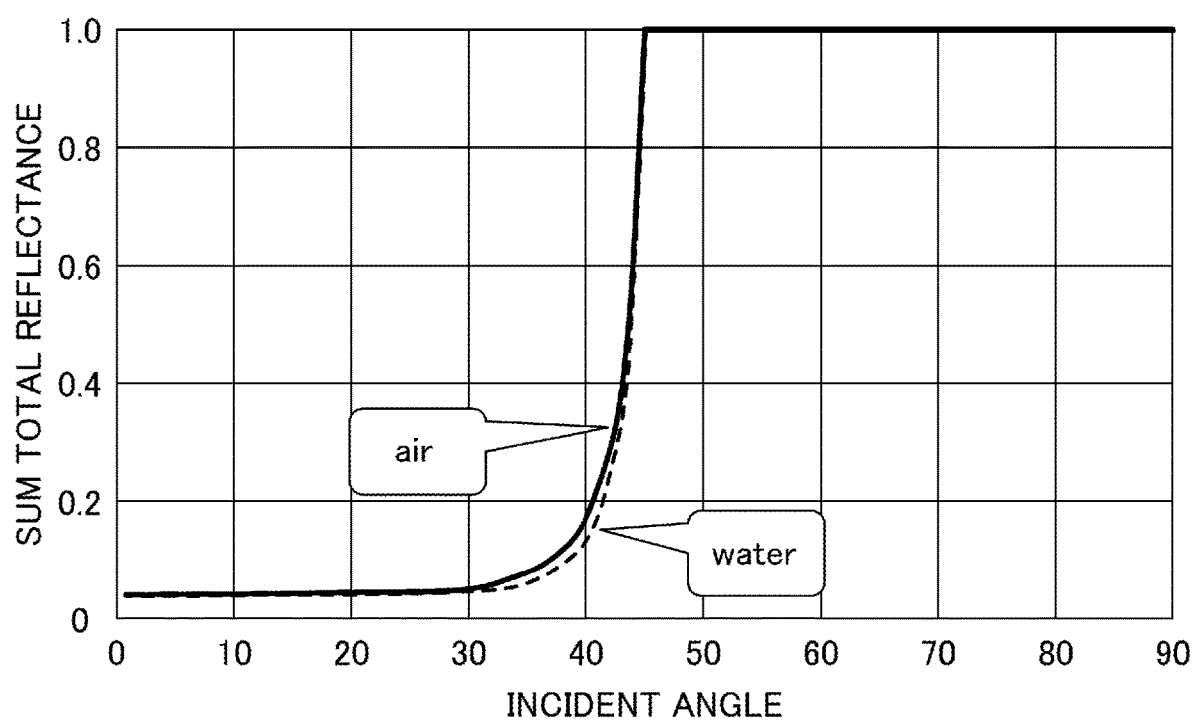
FIG. 15 is a diagram showing the incident-angle dependence of sum total reflectance with respect to the air and the water under the conditions of Case 4.

FIG. 15 shows the incident-angle dependence of sum total reflectance with respect to the external medium and water in Case 4. Again, in FIG. 15, the external medium is noted as "air" for the sake of convenience. The sum total reflectance is the same one as has been described with reference to FIG. 7, and is calculated by (1)+(2)×(3)×(4) using the reflected component (1) and the transmitted component (2) at the interface $I_1$, the reflected component (3) at the interface $I_2$, and transmitted component (4) returning to and again passing through the interface $I_1$.

Under the condition of Case 4, the incident-angle dependence of sum total reflectance with respect to air and the incident-angle dependence of sum total reflectance with respect to water overlap each other, and detection making use of the difference in sum total reflectance cannot be performed.

Figure 16A:
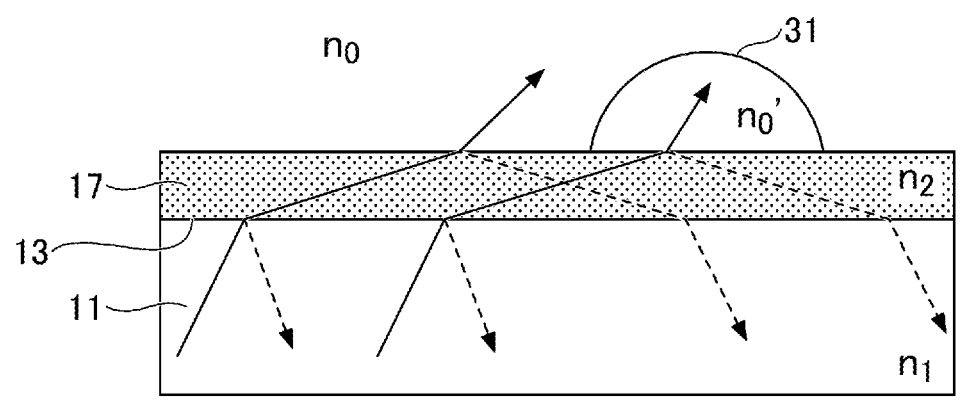
FIG. 16A is a schematic diagram illustrating behavior in region (A) of FIG. 14.

FIG. 16A schematically illustrates a behavior in the region (A) of FIG. 14. In the region (A), the light emitted from the light emitting device 15 (see FIG. 3) is incident on the curved surface 13 at an angle equal to or less than the critical angle with respect to the protective film 17, and passes through the interface between the optical cover 11 and the protective film 17. This light beam exits the droplet sensor 10 through the protective film 17 and enters the external medium, regardless of the presence or absence of water droplets 31 on the protective film 17. Total internal reflection does not occur with respect to air or water, and therefore, this region is not applicable to sensing making use of the changes in reflectance.

Figure 16B:
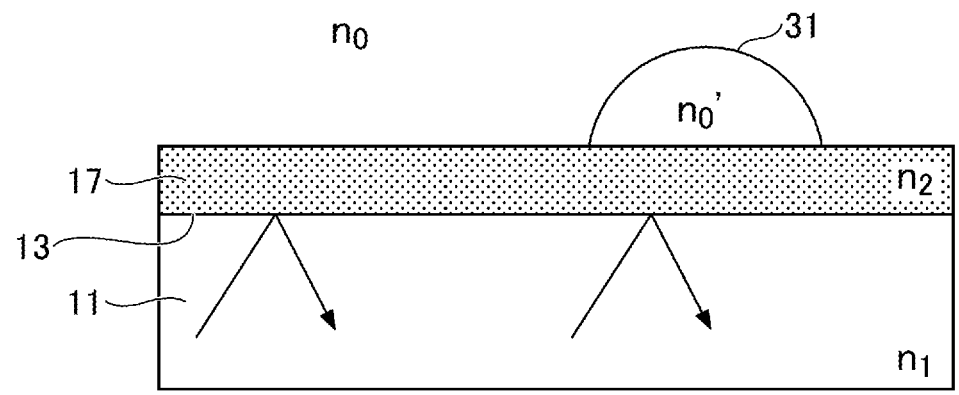
FIG. 16B is a schematic diagram illustrating behavior in region (D) of FIG. 14.

FIG. 16B schematically illustrates a behavior in the region (D) of FIG. 14. The light emitted from the light emitting device 15 is incident on the curved surface 13 at an angle exceeding the critical angle with respect to the protective film 17, and is totally reflected at the interface between the optical cover 11 and the protective film 17. The presence or absence of water droplets on the surface of the protective film 17 cannot be detected because the light does not reach the surface of the protective film 17.

In Case 4, neither Zone I nor Zone II is capable of sensing making use of the difference in reflectance between external substances. The protective film 17 needs to have a refractive index greater than at least the refractive index $n_0$ of the external medium.

[Protective Film with Multilayer Structure]

The protective film 17 is not limited to a single-layer film. In consideration of the environment of the droplet sensor 10 being used, a plurality of protective films may be stacked. For example, a UV block coat for blocking ultraviolet rays and a hard coat for preventing or suppressing scratches on the sensing surface may be provided. Configuration examples using a protective film 17 with a multilayer structure having two or more layers will be described below.

Figure 17:
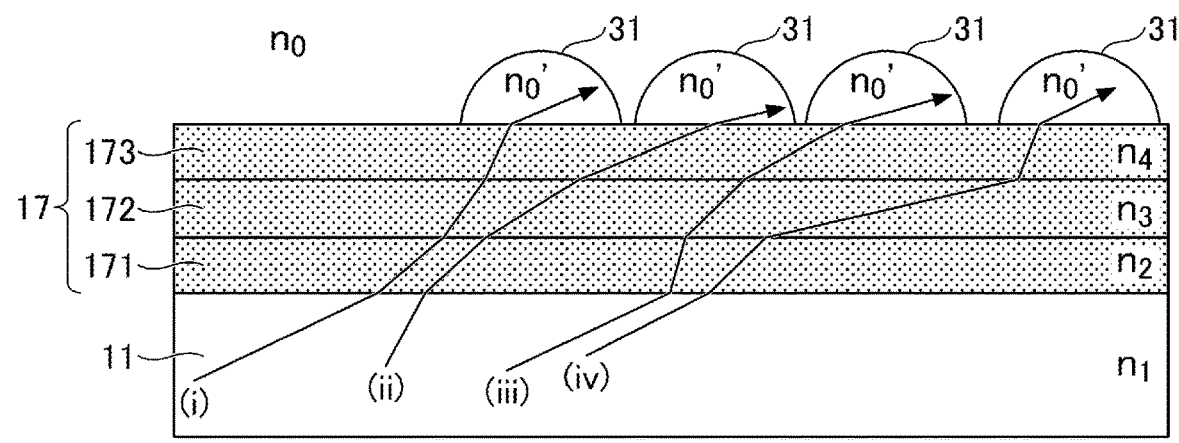
FIG. 17 shows refraction state when a multilayer protective film is used.

FIG. 17 shows refraction states when the multilayer protective film is used. In this example, the protective film 17 applied onto the optical cover 11 has a three-layer structure having a first film 171, a second film 172, and a third film 173 from the side adjacent to the optical cover 11. The refractive index of air is $n_0$, the refractive index of a liquid (e.g., water) to be detected is $n_0'$, and the refractive index of the optical cover 11 is $n_1$.

The refractive indexes of the first film 171, the second film 172, and the third film 173 are $n_2$, $n_3$, and $n_4$, respectively. It is assumed that the first film 171, the second film 172, and the third film 173 all have refractive indexes greater than that of air. Under the condition that the relationship of refractive index $n_0 < n_0' < n_1$, involving the water droplet 31 and the optical cover 11, is maintained, there are a maximum of 120 combinations of the magnitude relationship of the refractive index. Among them, the following four cases are considered.

(i) $n_0 < n_0' < n_1 < n_2 < n_3 < n_4$
(ii) $n_0 < n_0' < n_4 < n_3 < n_2 < n_1$
(iii) $n_0 < n_0' < n_1 < n_4 < n_3 < n_2$
(iv) $n_0 < n_3 < n_0' < n_1 < n_2 < n_4$ In Case (i), the refractive index increases monotonically from the lower layer to the upper layer of the droplet sensor 10, and total internal reflection does not occur at the interfaces, regardless of the incident angle. In addition, the refraction angle is smaller than the incident angle at all the interfaces except the interface with the water droplet 31, as illustrated by the optical path in FIG. 18. In this case, the droplet sensor 10 operates in the same manner as the configuration without the protective film 17. At the interface between the third film 173 and an external medium, the water droplet 31 can be effectively detected within the range of incident angle that satisfies the total internal reflection conditions with respect to air, and that does not satisfy the total internal reflection conditions with respect to water.

In Case (ii), the refractive index decreases monotonically from the lower layer to the upper layer of the droplet sensor 10, and total internal reflection may occur at any of the interfaces, depending on the incident angle. Specifically, if the incident angle onto the curved surface 13 is gradually increased, total internal reflection first occurs at the interface between the third film 173 and the water droplet 31. If the incident angle is further increased, total internal reflection occurs at the interface between the second film 172 and the third film 173. With the incident angle further increased, total internal reflection occurs at the interface between the first film 171 and the second film 172, and finally, total internal reflection occurs at the interface between the optical cover 11 and the first film 171.

Although total internal reflection occurs at any of the interfaces, depending on the incident angle, the same function as in the configuration without the protective film is maintained within the range of incident angle equal to or smaller than the angle of incidence onto the water droplet 31 because total internal reflection first occurs at the interface between the third film 173 and the water droplet 31.

In Case (iii), the refractive index increases from n1 to n2 when the light travels from the optical cover 11 to the first film 171 in the film stacking direction, and then decreases monotonically toward the upper layer. The optical cover 11 has the smallest refractive index $n_1$ among the four layers except the water droplet 31, and accordingly, total internal reflection does not occur before the light is incident onto the interface between the water droplet 31 and the third film 173 and totally reflected at that interface.

With the condition of Case (iii), the same function as in the configuration without the protective film is maintained. Namely, the water droplet 31 can be detected within the angle range in which total internal reflection occurs when the outer surface of the third film 173 is in contact with air, and in which total internal reflection does not occur when the outer surface of the third film 173 is in contact is the water droplet 31.

In Case (iv), as the light travels in the film stacking direction, while increasing the incident angle onto the curved surface 13, total internal reflection first occurs at the interface between the first film 171 and the second film 172 before the total reflection at the interface between the third film 173 and the water droplet 31. The same function as in the configuration without the protective film can be maintained within the angle range smaller than the incident angle onto the boundary surface between the first film 171 and the second film 172 at which total internal reflection occurs. However, the range of incident angle available for detection of the water droplet 31 is narrowed.

Based on the considerations on Cases (i) to (iv) described above, the operation of the droplet sensor 10 having the protective film 17 of a multilayer structure is as follows.

(a) If all the refractive indexes of the multiple layers included in the optical cover 11 and the protective film 17 are greater than the refractive index $n_0'$ of the water droplet 31, the same function as in the configuration without the protective film is maintained. The water droplet 31 can be detected making use of the difference in the refractive index between water and air.

(b) If there is a layer having a refractive index smaller than that of the water droplet 31 somewhere in the stack of the films, and if the incident angle onto the curved surface 13 is increasing, then total internal reflection occurs at the interface with that layer with the smaller refractive index, before the light reaches the interface with the water droplet 31. Although the same function as in the configuration without the protective film is maintained within the angle range smaller than the incident angle onto the interface at which total internal reflection first occurs, the incident angle range available for detection of the water droplet is narrowed.

In conclusion, by forming a plurality of films included in the protective film 17 of a material with a refractive index greater than that of the liquid to be detected, the detection scheme of the sensor without the protective film applies as it is. If a coating material having a refractive index higher than air and lower than the liquid to be detected is used, the range of incident angle that can be used for detection of droplets is narrowed, compared with a configuration without a protective film. Nevertheless, it still functions as a droplet sensor within the angle range that satisfies the total internal reflection conditions at the interface with gas and does not satisfy the total internal reflection conditions at the interface with liquid.

Figure 18:
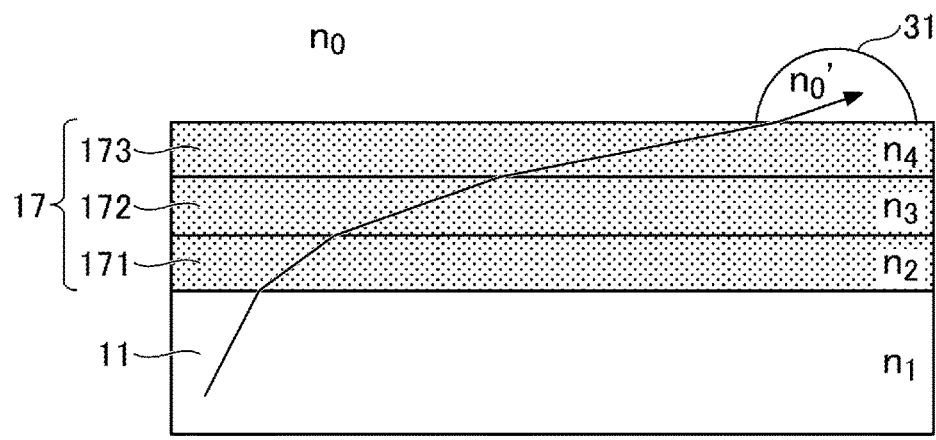
FIG. 18 shows an example of another refraction state when a multilayer protective film is used.

FIG. 18 shows another example of the refraction when a multilayer protective film is used. In FIG. 18, the refractive indexes of the materials satisfy the relation $N_0 < n_4 < n_0' < n_3 < n_2 < n_1$. The refractive index $n_4$ of the third film 173 that borders the water droplet 31 is greater than the refractive index $n_0$ of air, but smaller than the refractive index $n_0'$ of the water droplet 31. Therefore, total internal reflection does not occur at the interface between the third film 173 and the water droplet 31. However, total internal reflection can occur at an interface in the protective film 17 or the interface between the optical cover 11 and the protective film 17 before the light enters the water droplet 31.

The droplet sensor 10 operates in the same manner as the configuration without the protective film within the range of incident angle smaller than the incident angle at which total internal reflection first occurs at any of the interfaces with the angle of incidence of light onto the curved surface 13 being gradually increasing. In the example of FIG. 18, the refractive index decreases monotonically in the order of $n_1$, $n_2$, $n_3$ and $n_4$ in the layered structure, and total internal reflection first occurs at the interface between the second film 172 with $n_3$ and the third film 173 with $n_4$.

Figure 19:
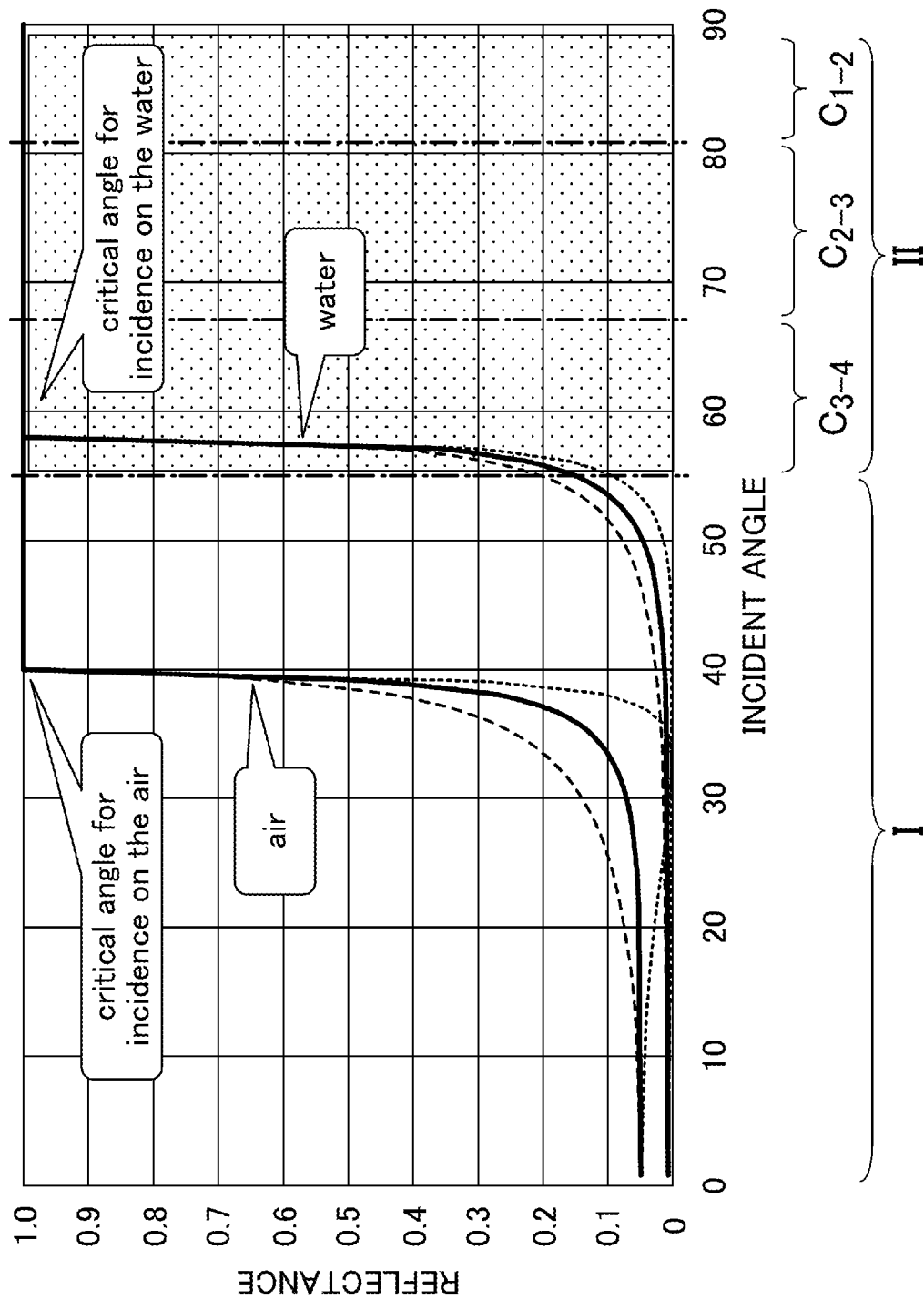
FIG. 19 shows an applicable range of the incident-angle dependence of reflectance under the conditions of FIG. 18.

FIG. 19 shows the applicable range of the incident-angle dependence of reflectance under the conditions of FIG. 18. The range of incident angle smaller than the incident angle at which total internal reflection occurs at the interface between $n_3$ and $n_4$ is defined as Zone I, in which the droplet sensor 10 operates in the same manner as the configuration without the protective film. The region beyond this angle of incidence is Zone II, where total internal reflection occurs before the light reaches the outer surface of the protective film 17.

In Zone I, there is a region that can be used as the sensing region of the water droplet 31, with the incident angle ranging from 40° to 54° in this example, having a significant difference in reflectance between air and water. Zone II is divided into three regions $C_{3-4}$, $C_{2-3}$ and $C_{1-2}$. The region $C_{3-4}$ is a region where total internal reflection occurs at the boundary between the materials with refractive indexes $n_3$ and $n_4$. The region $C_{2-3}$ is a region where total internal reflection occurs at the boundary between the materials with refractive indexes n: and $n_3$. The region $C_{1-2}$ is a region where total internal reflection occurs at the boundary between the materials with refractive indexes $n_1$ and $n_2$. Zone II cannot be used for sensing because total internal reflection occurs inside the protective film 17 or at the interface between the optical cover 11 and the protective film 17 before the sensing light reaches the outer surface of the protective film 17 and the light enters the water droplet 31.

Although the invention has been described above based on the specific configuration examples, the present invention is not limited to the above-described examples. For example, two films of the protective film having the three-layer structure shown in FIG. 18 may be formed of the same material. As long as Zone I, in which the same function as the configuration without the protective film can be achieved, is secured, the protective film 17 may be combined with a functional coating such as a water-repellent film, a light absorption film, or a reflective film. The surface other than the sensing surface SS shown in FIG. 1 may be covered with a light blocking film so as to serve as a non-sensing surface. With such a light blocking film, external light such as sunlight is prevented from entering the light emitting device or the photosensitive device such that the external light does not affect the sensing operations.

The light emitting device 15 and/or the photosensitive device 16 may be embedded in the optical cover 11 at the corresponding focal point(s), without providing the spherical space(s) 12a and/or 12b in the configuration of FIG. 3. Both ends in the X-axis direction of the spheroidal optical cover 11, which do not affect the droplet sensing operation, may be cut off along the YZ plane. The refractive index $n_1$ of the optical cover 11 can be selected in the range of, for example, 1.4 to 1.8. If the refractive index of the protective film 17 is higher than the refractive index of the liquid to be detected, the droplet sensor 10 works in the same manner as in the configuration without the protective film 17, regardless of whether the refractive index of the protective film 17 is higher or lower than the refractive index of the optical cover 11.

The droplet sensor according to the embodiment can be installed as a rain sensor on a roadside tree, a street lamp, etc. Alternatively, the droplet sensor can be installed near the windshield of the vehicle and used for wiper control.

What is claimed is:

1. A droplet sensor comprising:
    an optical cover having a curved surface that forms a part of a spheroid, the spheroid formed by rotating an ellipse around a major axis in an x-direction, a minor axis in a y-direction, with a height of the ellipse in a z-direction, the x-direction and y-direction forming an XY plane;
    a protective film that covers the curved surface of the optical cover;
    a light source provided at a first focal point of the ellipse in the XY plane; and
    a photodetector provided at a second focal point of the ellipse in the XY plane, wherein a refractive index of the protective film is greater than a refractive index of a liquid attached on the protective film, wherein a sensing region is determined between a first incident angle and a second incident angle, and the first incident angle is an incident angle at which a light beam emitted from the light source and incident onto the curved surface is totally reflected at an interface between the protective film and a gas contacting with the protective film, and the second incident angle is an incident angle at which the light beam emitted from the light source and incident onto the curved surface is not totally reflected at an interface between the protective film and the liquid wherein the protective film is a multilayer film having two or more films, and refractive indexes of the two or more films included in the multilayer film are greater than a refractive index of the liquid, and wherein the refractive indexes of the two or more films of the multilayer film monotonically increase or decrease beginning from an interface between a first film of the multilayer film and the optical cover.

2. A droplet sensor comprising:

an optical cover having a curved surface that forms a part of a spheroid, the spheroid formed by rotating an ellipse around a major axis in an x-direction, a minor axis in a y-direction, with a height of the ellipse in a z-direction, the x-direction and y-direction forming an XY plane;

a protective film that covers the curved surface of the optical cover;

a light source provided at a first focal point of the ellipse in the XY plane; and a photodetector provided at a second focal point of the ellipse in the XY plane, wherein a refractive index of the protective film is greater than a refractive index of a gas contacting with the protective film and is smaller than a refractive index of a liquid attached on the protective film, and wherein a sensing region is determined by a range of an incident angle of a light beam incident onto the curved surface from the light source, the range being greater than a critical angle at an interface between the protective film and the gas contacting with the protective film and being smaller than $\sin^{-1}(n_2/n_1)$, where $n_1$ denotes a refractive index of the optical cover, and $n_2$ denotes a refractive index of the protective film.

3. The droplet sensor as claimed in claim 1,
wherein the protective film is transparent to a wavelength of the light source.

4. The droplet sensor as claimed in claim 1,
wherein the protective film is a multilayer film having two or more films.

5. The droplet sensor as claimed in claim 1,
wherein the optical cover is made of a plastic material having a refractive index of 1.4 to 1.8.

6. The droplet sensor as claimed in claim 1
wherein a refractive index of the protective film is higher than a refractive index of the optical cover.

7. The droplet sensor as claimed in claim 2,
wherein the protective film is transparent to a wavelength of the light source.

8. The droplet sensor as claimed in claim 2,
wherein the protective film is a multilayer film having two or more films.

9. The droplet sensor as claimed in claim 2,
wherein the protective film is a multilayer film having two or more films, and a refractive index of a film included in the multilayer film is lower than a refractive index of the liquid attached on the protective film.

10. The droplet sensor as claimed in claim 2,
wherein the optical cover is made of a plastic material having a refractive index of 1.4 to 1.8.

11. The droplet sensor as claimed in claim 2
wherein a refractive index of the protective film is higher than a refractive index of the optical cover.

\* \* \* \* \*